United States Patent
Nakagawa

(10) Patent No.: US 7,554,635 B2
(45) Date of Patent: Jun. 30, 2009

(54) LIQUID CRYSTAL PROJECTOR, LIQUID CRYSTAL DEVICE AND SUBSTRATE FOR LIQUID CRYSTAL DEVICE

(75) Inventor: Kenichi Nakagawa, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 789 days.

(21) Appl. No.: 10/512,683

(22) PCT Filed: Jul. 16, 2003

(86) PCT No.: PCT/JP03/09037

§ 371 (c)(1),
(2), (4) Date: Oct. 27, 2004

(87) PCT Pub. No.: WO2004/010712

PCT Pub. Date: Jan. 29, 2004

(65) Prior Publication Data

US 2005/0168662 A1 Aug. 4, 2005

(30) Foreign Application Priority Data

Jul. 19, 2002 (JP) .............................. 2002-211376
Oct. 2, 2002 (JP) .............................. 2002-290183
Nov. 8, 2002 (JP) .............................. 2002-325645

(51) Int. Cl.
*G02F 1/1335* (2006.01)
(52) U.S. Cl. .......................................... 349/117; 349/5
(58) Field of Classification Search .................. 349/177
See application file for complete search history.

(56) References Cited

U.S. PATENT DOCUMENTS

| | | | |
|---|---|---|---|
| 5,016,988 A | | 5/1991 | Iimura |
| 5,196,953 A | * | 3/1993 | Yeh et al. ..................... 349/119 |
| 5,576,861 A | * | 11/1996 | Abileah et al. ............... 349/117 |
| 5,638,197 A | | 6/1997 | Gunning, III |
| 6,593,984 B2 | * | 7/2003 | Arakawa et al. ............. 349/117 |
| 6,621,543 B2 | * | 9/2003 | Moon .......................... 349/115 |
| 2002/0018162 A1 | * | 2/2002 | Suzuki et al. ............... 349/117 |

FOREIGN PATENT DOCUMENTS

| | | |
|---|---|---|
| EP | 1 160 617 | 12/2001 |
| JP | 2002-014345 | 1/2002 |
| JP | 2002-031782 | 1/2002 |
| JP | 2002-131750 | 5/2002 |

* cited by examiner

*Primary Examiner*—David Nelms
*Assistant Examiner*—Phu Vu
(74) *Attorney, Agent, or Firm*—Buchanan Ingersoll & Rooney PC

(57) ABSTRACT

Red incident light is reflected on a mirror (19) and linearly polarized by a polarizer (26R). Linearly polarized incident light enters a transmissive liquid crystal device (11R), in which oblique incident light is changed into elliptically polarized light. A retardation compensator (27R) between the liquid crystal device (11R) and an analyzer (28R) has an inorganic form birefringence layer. The retardation compensator (27R) yields birefringence effect to change elliptical polarized light into linearly polarized light. Linearly polarized light from the retardation compensator (27R) can pass the analyzer (28R) without decreasing intensity, and enters a color recombining prism (24). The liquid crystal device (11R) may have the inorganic form birefringence layer. Retardation in green and blue light is also compensated in the same manner. Red, green and blue image light, mixed in the color recombining prism (24), is projected onto a screen 3 by a projection lens system (25).

16 Claims, 20 Drawing Sheets (TYPE: A0)

(TYPE: A1)

(TYPE: A2)

(TYPE: A3)

(TYPE: A4)

(TYPE: A5)

(TYPE: B0)

(TYPE: B1)

(TYPE: B2)

(TYPE: B3)

(TYPE: B4)

(TYPE: B5)

(TYPE: C1)

LIQUID CRYSTAL PROJECTOR, LIQUID CRYSTAL DEVICE AND SUBSTRATE FOR LIQUID CRYSTAL DEVICE

TECHNICAL FIELD

The present invention relates to liquid crystal projector to display an image on a liquid crystal device and to project the image onto a screen.

BACKGROUND ART

A liquid crystal projector is widely used to project an image onto a screen. The liquid crystal projector illuminates the image displayed on a transmissive or reflective liquid crystal device, and focuses the image on the screen through a projection lens system, so that many people can view the image at the same time. The liquid crystal projector has a front projection type and a rear projection type. The front projection type projector projects the image from the front side (viewer side) of the screen, while the rear projection type projector projects the image from the rear side of the screen.

Although various types of liquid crystal devices are available for the liquid crystal projector, TN (Twisted Nematic) type liquid crystal device is mainly used. The TN type liquid crystal device has a liquid crystal layer between a pair of substrates. The orientation of major axes of liquid crystal molecules in the liquid crystal layer is kept parallel to the substrates, and inclined gradually in the thickness direction so that the major axes of the liquid crystal molecules twist smoothly by 90 degrees along a path from one substrate and the other substrate. The liquid crystal molecule layer is sandwiched by a pair of polarizing plates (polarizer and analyzer). The polarization axes of the polarizing plates for a normally white liquid crystal device are perpendicular to each other (cross nicol configuration). The polarization axes of the polarizing plates for a normally black liquid crystal device are parallel to each other (parallel nicol configuration).

The liquid crystal device can display an image by use of its optical rotatory effect. In the normally white type liquid crystal device, incident light is linearly polarized by the first polarizing plate. When no voltage is applied to a non-selected pixel in the liquid crystal device, the liquid crystal molecules in the liquid crystal layer are twisted so as to rotate the polarization direction of linearly polarized light by 90 degrees. Linearly polarized light through the liquid crystal layer can pass the second polarizing plate, so that the non-selected pixel appears a white state. When certain level of voltage is applied to a selected pixel, twisted alignment of the liquid crystal molecules does not appear. In that case, the polarization direction of linearly polarized light is not rotated in the liquid crystal layer, so linearly polarized light is blocked by the second polarizing plate. Thus, the selected pixel appears the black state.

The liquid crystal device has the disadvantage of narrow viewing angle because of its birefringence. Birefringence becomes dominant as the applied voltage to the liquid crystal layer is increased. Although incident light perpendicular to the liquid crystal device is completely blocked in the black state, the liquid crystal layer exhibits birefringence to oblique incident light to change linearly polarized light into elliptical polarized light. Since elliptical polarized light can pass the second polarizing plate, leakage of incident light causes the decrease in the black density of the selected pixel.

Such birefringence of the liquid crystal molecules is appeared at a state between the white and black states, so oblique incident light partially leaks. Thus, the contrast ratio of the image on the liquid crystal device decreases if viewed obliquely. Any type of the liquid crystal device has, more or less, such birefringence.

A direct view type liquid crystal display to observe the image directly has a retardation compensator for the purpose of decreasing birefringent effect. As the retardation compensator, "Fuji WV Film Wide View A" (trade name, hereinafter referred to as "WV Film"), manufactured by Fuji Photo Film Co., Ltd., has been in the market. A form birefringence layer with stacked thin films is used as the retardation compensator to prevent the decrease of the contrast ratio of the obliquely viewed image, as described in the publication, Eblen J P, "Birefringent Compensators for Normally White TN-LCDs", SID Symposium Digest, Society for Information Display, 1994, pp. 245-248. In addition, U.S. Pat. No. 5,638,197 describes a retardation compensator in which plural thin films are obliquely deposited on a substrate.

The retardation compensators described above are utilized to the direct view type liquid crystal display in which an observer right in front of the display panel observes the image at a distance more than the distance of distinct vision. In the direct view type liquid crystal display, the observer can adjust the contrast ratio of the image in the edge area by slightly moving the eye positions. If the image is observed by plural observers at the same moment, low contrast ratio area unlikely occurs because the distance between the displayed image and the observers is large enough to decrease the viewing angle.

In the liquid crystal projector, incident light through the liquid crystal layer is projected to the screen through a projection lens system. The observer can view the projected image on the screen. The contrast ratio of the displayed image decreases because of oblique incident light to the liquid crystal layer. Then, it is impossible to increase the contrast ratio of the projected image even if the observer tries to change the viewing angle. The projection lens system with large back focus can increase the contrast ratio of the projected image because such lens system decreases the incident angle of incident light to the liquid crystal layer. Such projection lens system, however, is disadvantageous in terms of making the projector smaller.

Accordingly, the technique to increase the viewing angle of the liquid crystal display is effective in order to solve the contrast ratio problem of the liquid crystal projector. For instance, Japanese Laid-Open Patent Publications (JP-A) No. 2002-014345 and 2002-031782 describe the technique to increase the contrast ratio of the projected image by applying the retardation compensator to the liquid crystal device for the liquid crystal projector. The liquid crystal projector in JP-A No. 2002-014345 describes organic materials, such as the WV Film, as the retardation compensator for the TN type liquid crystal device. The retardation compensator in JP-A No. 2002-031782 discloses a uniaxial birefringent crystal, such as single crystal sapphire and crystal. In addition, JP-A No. 2002-131750 describes a Discotic type liquid crystal as the retardation compensator.

The retardation compensators described above work as the form birefringence body to exhibit optical anisotropy effect depending upon the incident angle of oblique incident light. Such anisotropy effect of the retardation compensator can prevent the decrease in the contrast ratio of the projected image which is caused by oblique emanation light from the liquid crystal device with large emanation angle.

The organic retardation compensator tends to be discolored by long exposure to light including ultraviolet component. Intensity of the light source in the liquid crystal projector has to be higher than that of the direct view type liquid crystal display. Higher intensity of the light source causes excessive heat to the retardation compensator. The retardation compensator tends to be colored brown in 2000 to 3000 hours. Because of its low durability, it is difficult to utilize the organic retardation compensator to the home use liquid crystal projection TV.

The retardation compensator made of sapphire or crystal has great durability for long-term use, but the sapphire and crystal are expensive. Moreover, the cut surface and the thickness of the sapphire or crystal must be controlled precisely to exhibit desired optical characteristics. Furthermore, the orientation of the retardation compensator of sapphire or crystal must be aligned precisely in the assembly of the projection optical system. Accordingly, sapphire or crystal retardation compensator is not appropriate for household type liquid crystal projector in terms of manufacture cost, regardless of great durability.

The transmissive liquid crystal device has a micro lens array to compensate the decrease in aperture ratio of each pixel caused by a black matrix sections to divide the pixel electrodes on the substrate. Since the micro lens array changes the incidence angle of incident light to the liquid crystal device, it is difficult to obtain the designed effect of the retardation compensator. Moreover, the micro lens array limits the position of the retardation compensator.

An object of the present invention is to provide a liquid crystal projector to increase the contrast ratio of the image projected on the screen.

Another object of the present invention is to increase durability of the retardation compensator in the liquid crystal projector enough for long-term use, such as a household television.

Further object of the present invention is to decrease the manufacture cost of retardation compensator for the liquid crystal projector.

Still further object of the present invention is to improve the contrast ratio of the projected image when a micro lens array is combined with the liquid crystal device.

DISCLOSURE OF INVENTION

A liquid crystal projector in the present invention comprises a polarizer and an analyzer provided in the incidence plane side and the emanation plane side of the liquid crystal device, and an inorganic form birefringence layer to compensate the retardation caused by the liquid crystal device. The form birefringence layer is provided between the polarizer and the analyzer in at least one of the incidence plane side and the emanation plane side of the liquid crystal device. It is possible to provide the form birefringence layer in the reflective liquid crystal projector in which incidence plane of the liquid crystal device is the same as the emanation plane thereof.

In a preferred embodiment, the form birefringence layer is plural thin films comprising at least two kinds of thin film layers with different refractive index alternatively stacked. The optical thickness of each thin film layer is from $\lambda/100$ to $\lambda/5$, wherein $\lambda$ is the wavelength of illumination light that enters the liquid crystal device.

The form birefringence layer may be formed in the liquid crystal device. In this case, the liquid crystal device has a liquid crystal layer between a pair of substrate bodies. The form birefringence layer, formed on at least one of the inner and outer surfaces of the substrate body, compensates retardation caused by birefringence in the liquid crystal layer.

In another preferred embodiment, the form birefringence layer is a plurality of birefringence members arranged to appear one or two dimensional refractive index distribution in the plane perpendicular to the optical axis of illumination light or image light. The birefringence members may be inclined to the optical axis of illumination light or image light.

According to the present invention, since the inorganic form birefringence layer is used as the retardation compensator to increase the contrast ratio of the image projected on the screen, it is possible to utilize the projector with high image contrast ratio for long-term use, such as a household television.

BEST MODE FOR CARRYING OUT THE INVENTION

Figure 1:
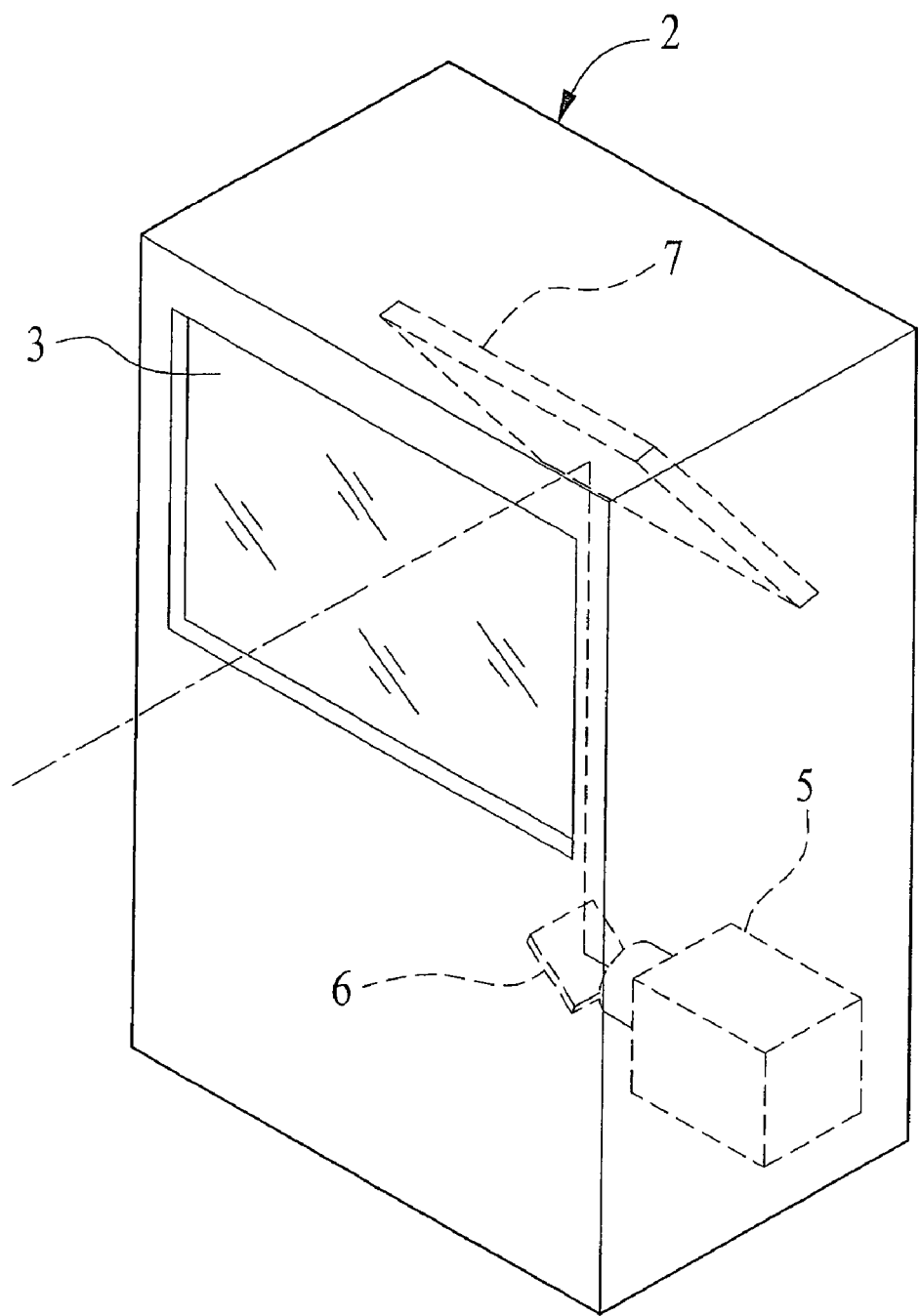
FIG. 1 is a front perspective view of a liquid crystal projector of rear projection type.

A liquid crystal projector of rear projection type is depicted in FIG. 1. A diffuse transmissive screen 3 is provided in the front side of a housing 2 of the liquid crystal projector. An image projected from the rear side of the screen 3 is observed from the front side thereof. The image projected by an image projection unit 5 with a liquid crystal device, assembled in the housing 2, is reflected on the mirror 6, 7 and focused on the rear side of the screen 3. The liquid crystal projector may be used as a wide screen television by incorporating well-known electrical circuits such as a tuner circuit, a video/sound signal reproduction circuit. In that case, the reproduced video images are displayed on the liquid crystal device of the image projection unit.

Figure 2:
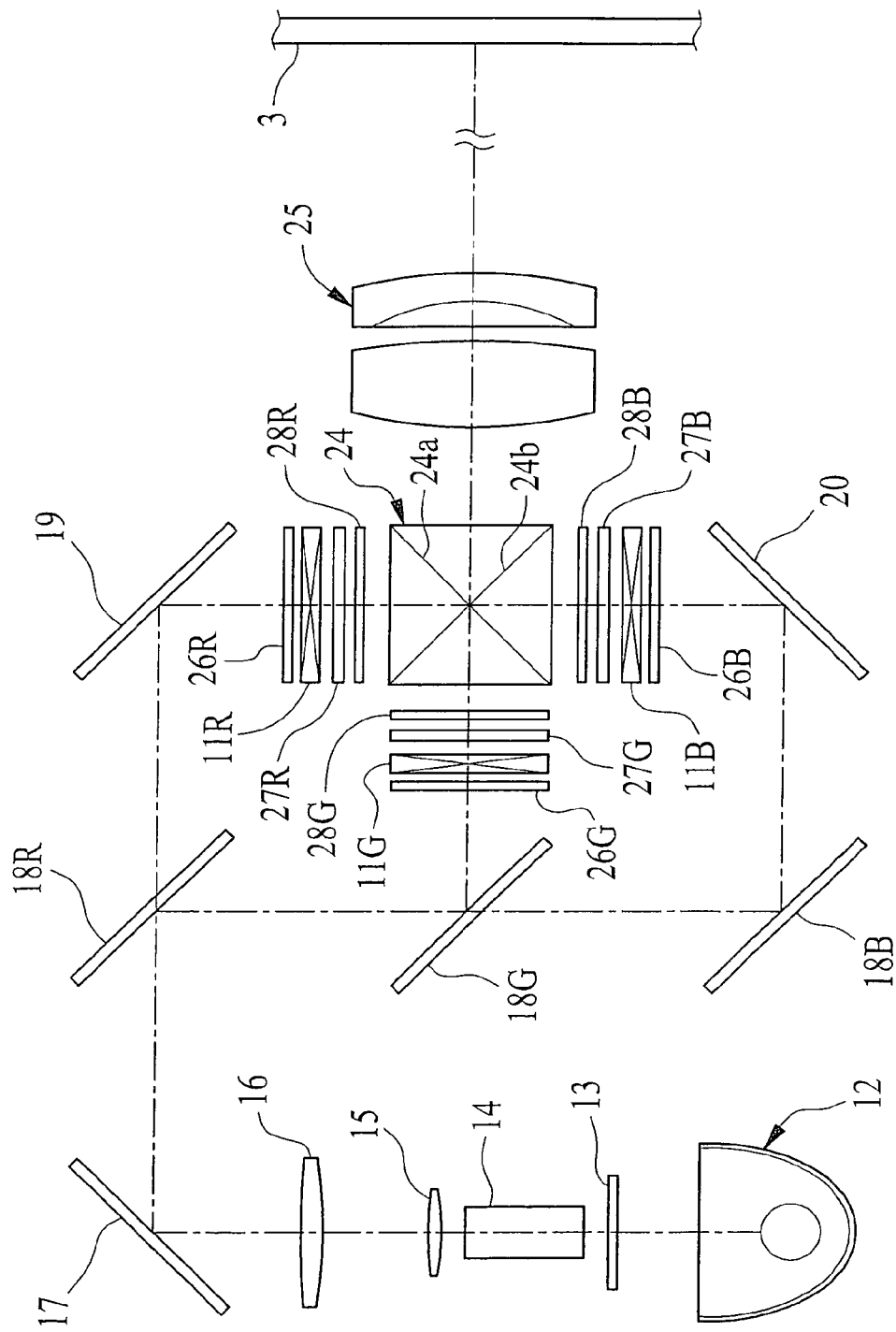
FIG. 2 is a block diagram showing an optical system of the liquid crystal projector with a transmissive liquid crystal device.

As shown in FIG. 2, the image projection unit 5 has three transmissive liquid crystal devices for red, green and blue images 11R, 11G, 11B to project a full color image onto the screen 3. Emission light from a light source 12 becomes white light including red, green and blue light by a cut filter 13 to cut ultraviolet and infrared components. White light goes along an illumination light axis (one dotted line in the drawing) and enters a glass rod 14. Since the incident plane of the glass rod 14 is located in the vicinity of the focal position of the parabolic reflector of the light source 12, white light from the cut filter 13 enters the incident plane of the glass rod 14 without having large loss.

After passing through the glass rod 14, white light is collimated by a relay lens 15 and a collimate lens 16. Collimated white light is reflected on a mirror 17 toward a dichroic mirror 18R that passes red light and reflects blue and green light. The liquid crystal device for red image 11R is illuminated from behind by red light that is reflected on a mirror 19. Blue and green light, reflected on the dichroic mirror 18R, reaches a dichroic mirror 18G in which only green light is reflected. Green light reflected on the dichroic mirror 18G illuminates the liquid crystal device for green image 11G from behind. Blue light, reflected on mirrors 18B, 20, illuminates the liquid crystal device for blue image 11B from behind.

The liquid crystal devices 11R, 11G, 11B contain TN liquid crystal layer and displays red, green and blue density images, respectively. Red, green and blue light through the liquid crystal devices 11R, 11G and 11B becomes red, green and blue image light, respectively. A color recombining prism 24 is located at the position where the optical distances from the center of the color recombining prism 24 to the liquid crystal devices 11R, 11G, 11B are the same. The color recombining prism 24 has two dichroic planes 24a, 24b to reflect red light and blue image light respectively, so that red, green and blue image light is mixed into full color image light.

A projection lens system 25 is located on a projection optical axis from the emanation plane of the color recombining prism 24 to the screen 3. The object side focal point of the projection lens system 25 is on the emanation planes of the liquid crystal devices 11R, 11G, 11B. The image side focal point of the projection lens system 25 is on the screen 3. Thus, full color image light from the color recombining prism 24 is focused on the screen 3 by the projection lens system 25. Note that the mirrors 6, 7 in FIG. 1 are omitted for the purpose of simplification of the drawing.

Front polarizing plates 26R, 26G, 26B as the polarizers are respectively provided in front of the incident planes of the liquid crystal devices 11R, 11G, 11B. Retardation compensators 27R, 27G, 27B and rear polarizing plates 28R, 28G, 28B as the analyzers are arranged in the emanation plane side of the liquid crystal devices 11R, 11G, 11B. The polarization direction of the front polarizing plates 26R, 26G, 26B and the rear polarizing plates 28R, 28G, 28B are perpendicular to each other (cross nicol configuration). The operations of the polarizing plates and the retardation compensators for red, green and blue channels are basically the same, regardless of the insignificant difference based on the difference in wavelength. Thus, only the red channel is described in the following description.

Red light reflected on the mirror 19 is subject to linear polarization by the front polarizing plate 26R, and enters the liquid crystal device for red 11R of normally white type. A certain level of voltage is applied to the liquid crystal layer of the selected pixel to display a black pixel image. If red incident light enters the liquid crystal device 11R perpendicular to the incidence plane, red incident light is completely blocked by the rear polarizing plate 28R.

When red incident light obliquely enters the incidence plane, however, the birefringent effect of the liquid crystal molecules appears to give rise to retardation of incident light. Then, linearly polarized and oblique incident light is changed into elliptical polarized light during the passage through the liquid crystal layer. Such elliptical polarized light causes light leakage from the selected pixel, so that the black density decreases. In the liquid crystal device of normally black type, the liquid crystal molecules are slightly inclined. Thus, linearly polarized incident light is changed into elliptical polarized light so that the black density of a pixel decreases.

The retardation compensator 27R, located between the liquid crystal device 11R and the rear polarizing plate 28R, compensates the retardation so that elliptical polarized light changes into linearly polarized light. Due to the retardation compensation, the rear polarizing plate 28R can decrease intensity of red image light, so that the black density in the pixel image increases. Thus, it is possible to increase the image contrast ratio.

Figure 3:
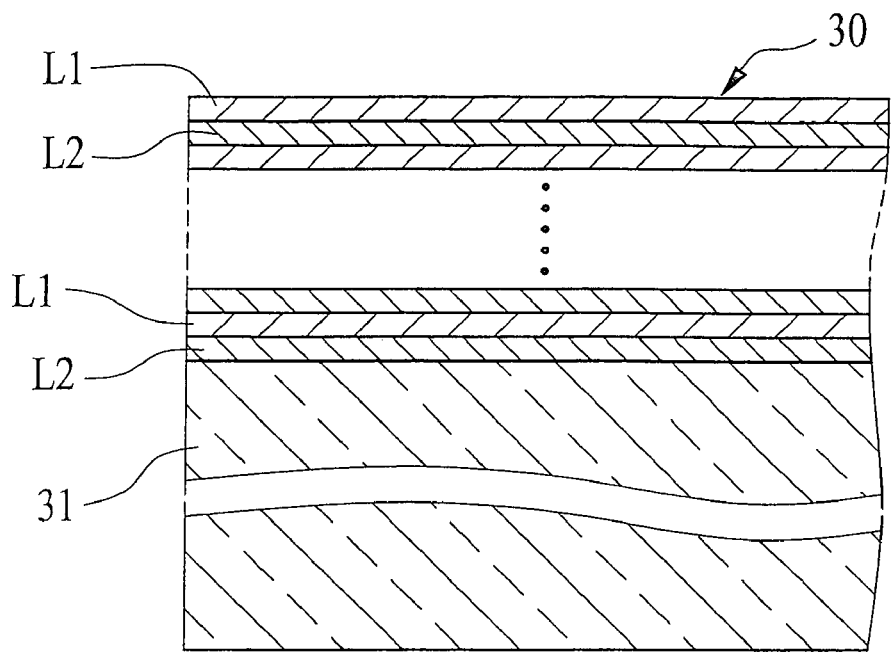
FIG. 3 is a schematic cross section of an example of the retardation compensator.

The liquid crystal projector of the present invention utilizes an inorganic form birefringence layer in the retardation compensator 27R, as shown in FIG. 3. The form birefringence layer 30 comprises plural thin films L1, L2 that are alternatively stacked on the transparent glass substrate 31. The refractive indices of the thin films L1, L2 are different from each other.

The optical thickness (the product of the physical thickness and the refractive index) of each thin film is smaller than the wavelength λ of incident light. The optical thickness of each thin film is preferably from λ/100 to λ/5, more preferably from λ/50 to λ/5, and practically from λ/30 to λ/10. Thereby, the retardation compensator 27R exhibits negative birefringence of the c-plate (uniaxial birefringent plate). The retardation compensator 27R is located such that the surfaces of the thin films are perpendicular to the illumination optical axis of incident light.

Examples of the materials for the high refractive index thin film are $TiO_2$ (2.20 to 2.40) and $ZrO_2$ (2.20). The numerical value in the parentheses indicates the refractive index. Examples of the materials for the low refractive index thin film are $SiO_2$ (1.40 to 1.48), $MgF_2$ (1.39) and $CaF_2$ (1.30). As the materials for the high and low refractive index thin films, it is possible to use the materials, such as $CeO_2$ (2.45), $SnO_2$ (2.30), $Ta_2O_5$ (2.12), $In_2O_3$ (2.00), $ZrTiO_4$ (2.01), $HfO_2$ (1.91), $Al_2O_3$ (1.59 to 1.70), MGO (1.70), $ALF_3$, thin diamond film, $LaTiO_x$ and samarium oxide. Examples of the combinations for high and low refractive index thin films are $TiO_2/SiO_2$, $Ta_2O_5/Al_2O_3$, $HfO_2/SiO_2$, $MgO/Mgf_2$, $ZrTiO_4/Al_2O_3$, $CeO_2/CaF_2$, $ZrO_2/SiO_2$ and $ZrO_2/Al_2O_3$.

The optical thickness of each thin film is preferably as small as possible in order to prevent optical interference between the thin films L1, L2. However, smaller thickness of each thin film causes an increase in deposition cycles to form the retardation compensator with desired total thickness. Thus, the refractive index, the thickness ratio and the total thickness are determined based on birefringence and the number of deposition cycles. The thin films may be colored so long as the colored layer does not affect the thin film interference. It is necessary to choose the materials of the thin films not to have a crack caused by internal stress of the deposited thin films.

The plural thin films in the form birefringence layer are deposited by use of deposition equipment, such as vacuum deposition equipment or sputter deposition equipment. The deposition equipment has shutters to shield the substrate from the source materials. The shutters are alternatively open and close while heating the deposition source materials, so that the two kinds of thin film layers are alternatively deposited on the substrate. Instead of the shutters, the substrate may be held on a holder that moves the substrate at a predetermined speed. The thin film layers are alternatively deposited by passing the substrate above the heated source materials. Since these deposition equipments require a single vacuum process in order to obtain plural thin films, it is possible to increase the productivity.

The thickness of each thin film in form birefringence layer is designed as follows. As described in the publication, Kogaku (Japanese Journal of Optics), vol. 27, no. 1 (1998), pp. 12-17, the birefringence $\Delta n$ is defined as the ratio of optical thicknesses of two thin films with different refractive indices. The birefringence $\Delta n$ becomes large as the difference in refractive indices. The retardation d·$\Delta n$ is defined as the product of the birefringence $\Delta n$ and the total physical thickness d of the birefringence layer. The materials for the thin film layers are chosen so as to obtain a large birefringence $\Delta n$. Then, the total physical thickness d is determined based on the desired retardation d·$\Delta n$. The number of the deposited thin film layers is determined in consideration of the total physical thickness d and the numerical condition of the optical thickness of each layer described above.

As for the examples of the optical devices with plural dielectric layers, a dichroic mirror, a polarization beam splitter, a color composition prism and anti-reflection coating are well known. The optical thickness of each layer is designed to be integer multiplication of $\lambda/4$ so that the optical devices exhibit optical interference. On the other hand, the optical thickness of each film in the form birefringence layer is less than $\lambda/4$. Moreover, the optical thickness of each film is controlled to obtain a desired birefringence $\Delta n$. Thus, it is clear that the form birefringence layer in the retardation compensator exhibits different optical function from other optical devices.

As described above, the retardation d·$\Delta n$ of the form birefringence layer 30 is defined as the product of the birefringence $\Delta n$ and the total physical thickness d of the birefringence layer. A first sample of the form birefringence layer 30 is prepared by depositing 40 $TiO_2$ layers and 40 $SiO_2$ layers alternatively on the glass substrate. The physical thickness of each layer is 15 nm. A spectroscopic ellipsometer is used to measure the retardation of the first sample of the form birefringence layer. The first sample exhibits negative birefringence with the retardation of 208 nm, and the ordinary optical axis (the axis with no optical anisotropy) of the sample perpendicular to the substrate. Accordingly, the first sample of the form birefringence layer performs as a negatively birefringent c-plate.

Figure 4:
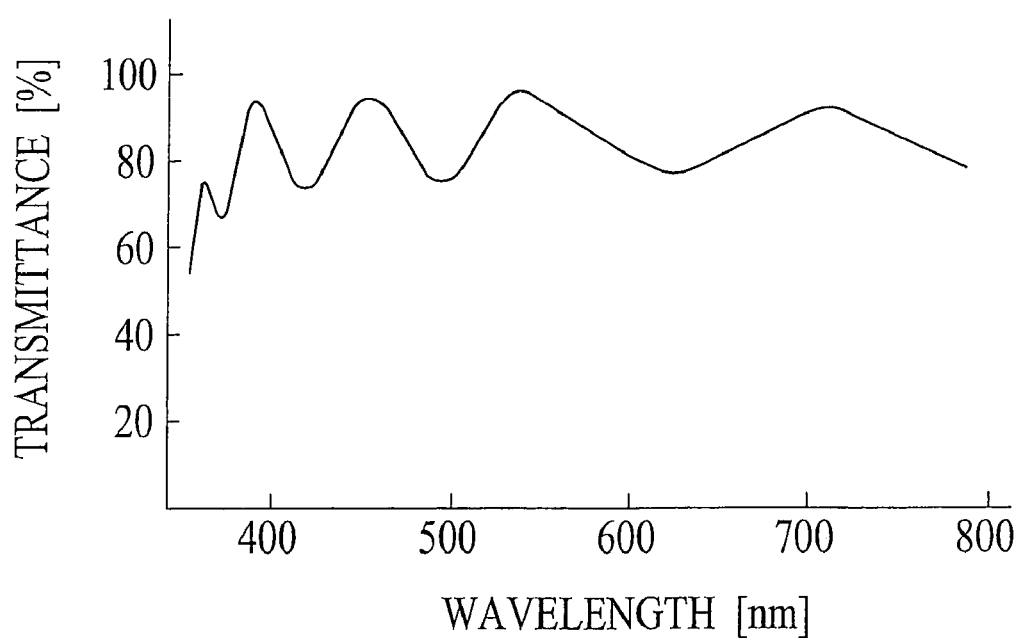
FIG. 4 is a graph showing the spectral transmittance curve of the retardation compensator.

The theoretical retardation of the form birefringence layer is calculated. The theoretical refractive indices of the $TiO_2$ layer and the $SiO_2$ layer are 2.35 and 1.47, respectively. The calculated theoretical retardation is 218 nm, which is substantially the same as the measured value. The difference between the measured value and the calculated value is within the error range. The spectral transmittance curve shown in FIG. 4 shows that the form birefringence layer is transparent within the visible range. The ripples in the graph show the interference between reflected light from the glass substrate and from the uppermost thin film. It is possible to remove the ripples by providing anti-reflection coatings on both sides of the glass substrate and the uppermost thin film.

The contrast ratio between the brightest pixel and the darkest pixel of the liquid crystal projector with the first sample is improved to 400:1, compared to the contrast ratio without the form birefringence layer (200:1). Moreover, the form birefringence layer is not discolored even after the use for 5000 hours.

Figure 5:
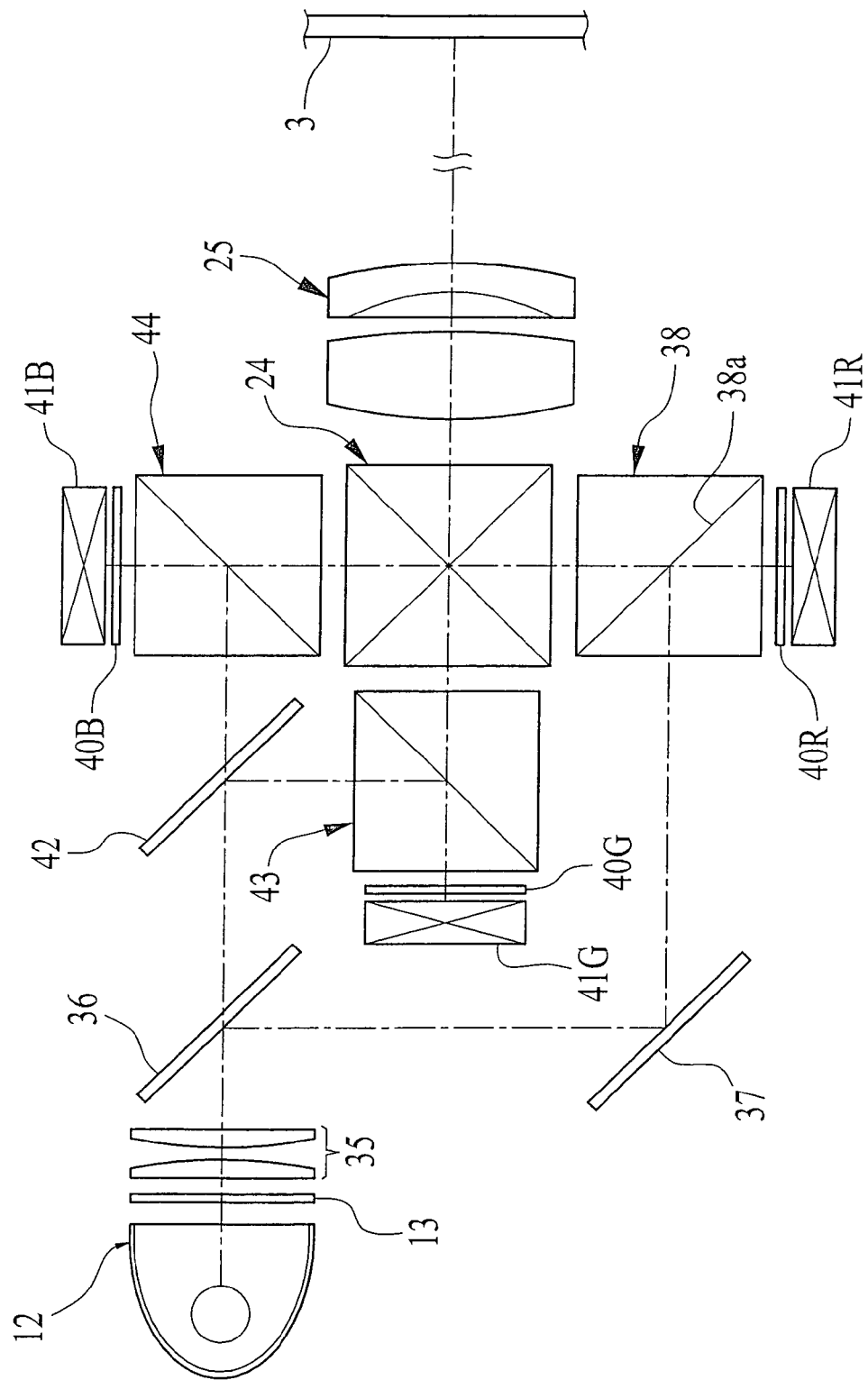
FIG. 5 is a block diagram showing an optical system of the liquid crystal projector with a reflective liquid crystal device.

The form birefringence layer is applicable to not only the transmissive liquid crystal projector but the reflective liquid crystal projector. As shown in FIG. 5, incident light from the light source 12 is changed into white light by the cut filter 13. White light including red, green and blue light goes through a focusing optical system 35 and reaches a dichroic mirror 36 on which only red light is reflected. Red light reflected on the dichroic mirror 36 and a mirror 37 enters a polarization beam splitter 38 having a polarization plane 38a. The polarization plane 38a changes the s-polarization component of red incident light into linearly polarized light, and reflects linearly polarized light toward a retardation compensator 40R and a reflective liquid crystal device 41R.

Similarly, green light through the dichroic mirror 36 is reflected on a dichroic mirror 42 toward a polarization beam splitter 43, so that linearly polarized green light enters a retardation compensator 40G and a reflective liquid crystal device 41G. Blue light through the dichroic mirror 42 enters a polarization beam splitter 44, in which linearly polarized blue light is reflected toward a retardation compensator 40B and a reflective liquid crystal device 41B.

The reflective liquid crystal device 41R has a TN liquid crystal layer and a mirror disposed in the opposite side of the polarization beam splitter 38. Polarized light through the liquid crystal device 41R is reflected on the mirror so that polarized light goes through the liquid crystal device 41R twice. Polarized light emanated from the liquid crystal device 41R goes through the retardation compensator 40R and enters the polarization beam splitter 38. Since p-polarization component of red light is linearly polarized with respect the polarization plane 38a, linearly polarized light can pass the polarization plane 38a and enters the color recombining prism 24. When a voltage is applied to the pixel in the liquid crystal device 41R, the liquid crystal molecules changes the polarization direction of linearly polarized light so as to decrease the density of the pixel image on the screen 3. The structure and the function of the color recombining prism 24 and the projection lens system 25 are the same as those in the transmissive liquid crystal projector.

A second sample of the form birefringence layer is formed by depositing 20 $TiO_2$ layers and 20 $SiO_2$ layers alternatively on the glass substrate. The physical thickness of each layer is 15 nm. The measured retardation of the second sample is 102 nm, which is substantially the same as the theoretical retardation (107 nm). The contrast ratio between the brightest pixel and the darkest pixel of the reflective liquid crystal projector with the first sample is improved to 300:1, compared to the contrast ratio of the one without the form birefringence layer (150:1).

Figure 6A:
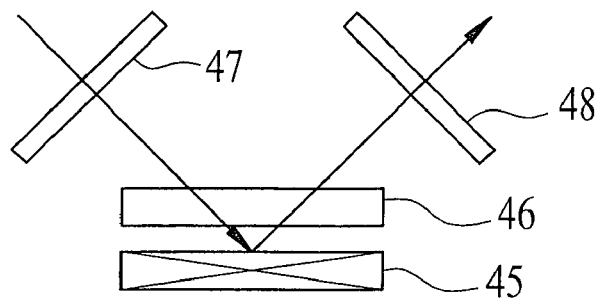
FIGS. 6A and 6B are explanatory views of the reflective liquid crystal device with the retardation compensator.

The retardation compensator 40R exhibits a function to compensate the retardation caused by the birefringence effect of the liquid crystal molecules in the liquid crystal device 41R. In determining the retardation of the retardation compensator 40R, it is necessary to consider that polarized light passes the liquid crystal device 41R twice. When the reflective liquid crystal device is located at an off-axis position (the position where the incidence optical axis and the emanation optical axis are different), the retardation compensator 46 may be parallel to the liquid crystal device 45, as shown in FIG. 6A.

The retardation compensator 46 must be located on the light path between the emanation plane of the polarizer 47 and the incidence plane of the analyzer 48. The retardation compensator 46 may be located either on the incidence optical axis or the emanation optical axis of the liquid crystal device 45, because changing the position of the retardation compensator 46 makes substantially no difference in optical characteristics. Thus, the position of the retardation compensator 46 is decided in consideration of other design requirements.

Figure 6B:
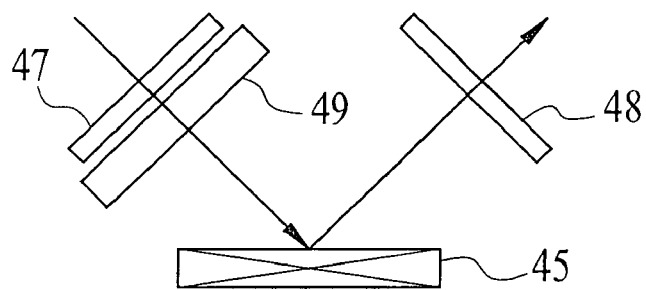

The retardation compensator 49 may be positioned between the polarizer 47 and the liquid crystal device 45, as shown in FIG. 6B, or between the liquid crystal device 45 and the analyzer 48. Moreover, a pair of the retardation compensators may be provided on the incidence and emanation optical axes of the liquid crystal device 45. In that case, it is necessary to design the optical characteristics of each of the retardation compensators such that the pair of the retardation compensators exhibits the desired retardation in total.

Figure 7:
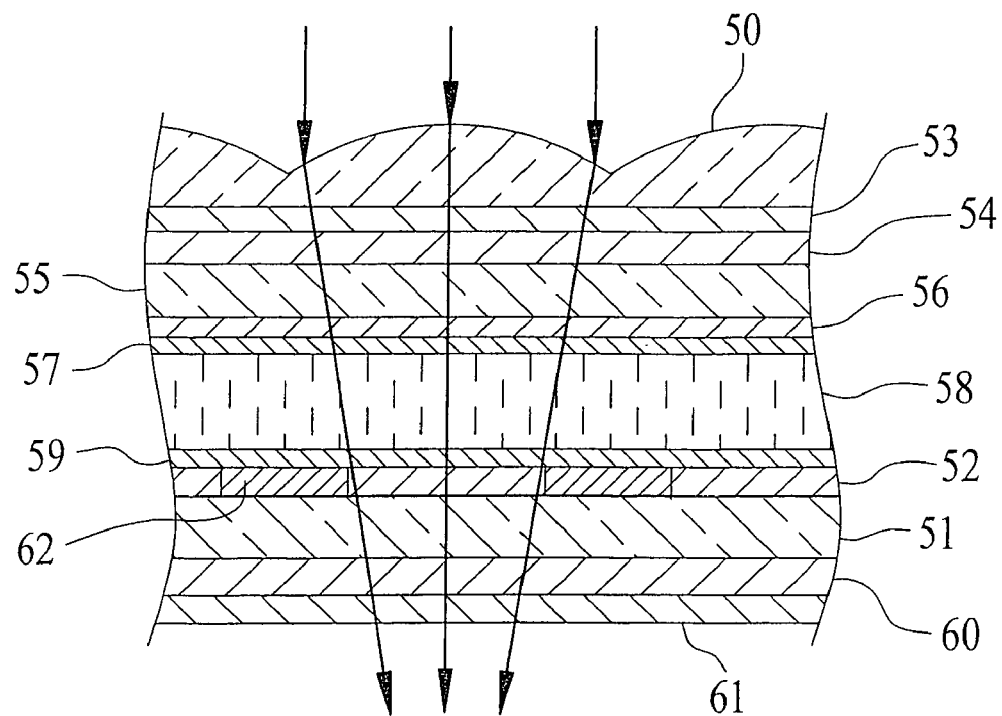
FIG. 7 is a schematic cross section showing the transmissive liquid crystal device with the retardation compensators and a micro lens array.

The transmissive liquid crystal device may be combined with micro lenses 50 to increase aperture ratio of the pixels, as shown in FIG. 7. The micro lenses 50 are provided on a polarizing plate 53 as the polarizer. Each of the micro lenses 50 corresponds to each pixel that is separated from other pixels by black matrix portions 62 in a pixel electrode 52. Converging incidence light through the micro lens 50 reaches the liquid crystal layer 58 through the polarizing plate 53, a first retardation compensator 54, a glass substrate 55, a base electrode 56 and an alignment film 57. Polarization state of incidence light changes by the liquid crystal layer 58 in accordance with the pixel density. Polarized light passes an alignment film 59, the pixel electrode 52, a glass substrate 51 and the second retardation compensator 60. Then, polarized light is emanated outside through the polarizing plate 61 as the analyzer, in which the intensity of polarized light decreases in accordance with the pixel density.

In this embodiment, the first retardation compensator 54 in the incident plane side of the liquid crystal device is effective for the purpose of compensation of the retardation of incident light that enters the liquid crystal device obliquely by the micro lens 50. Moreover, it is possible to provide the second retardation compensator 60 in the emanation plane side, as shown in FIG. 7. The first and second retardation compensators 54, 60 exhibit the desired retardation in total in this embodiment. Note that the liquid crystal devices in the embodiments shown in FIG. 2, 5 may be combined with micro lenses and retardation compensator in the incident plane side.

In the embodiments above, the form birefringence layer is separated from the liquid crystal device, but it is possible to incorporate the form birefringence layer in the liquid crystal device. Embodiments of the liquid crystal device with the form birefringence layer will be described below.

Figure 8:
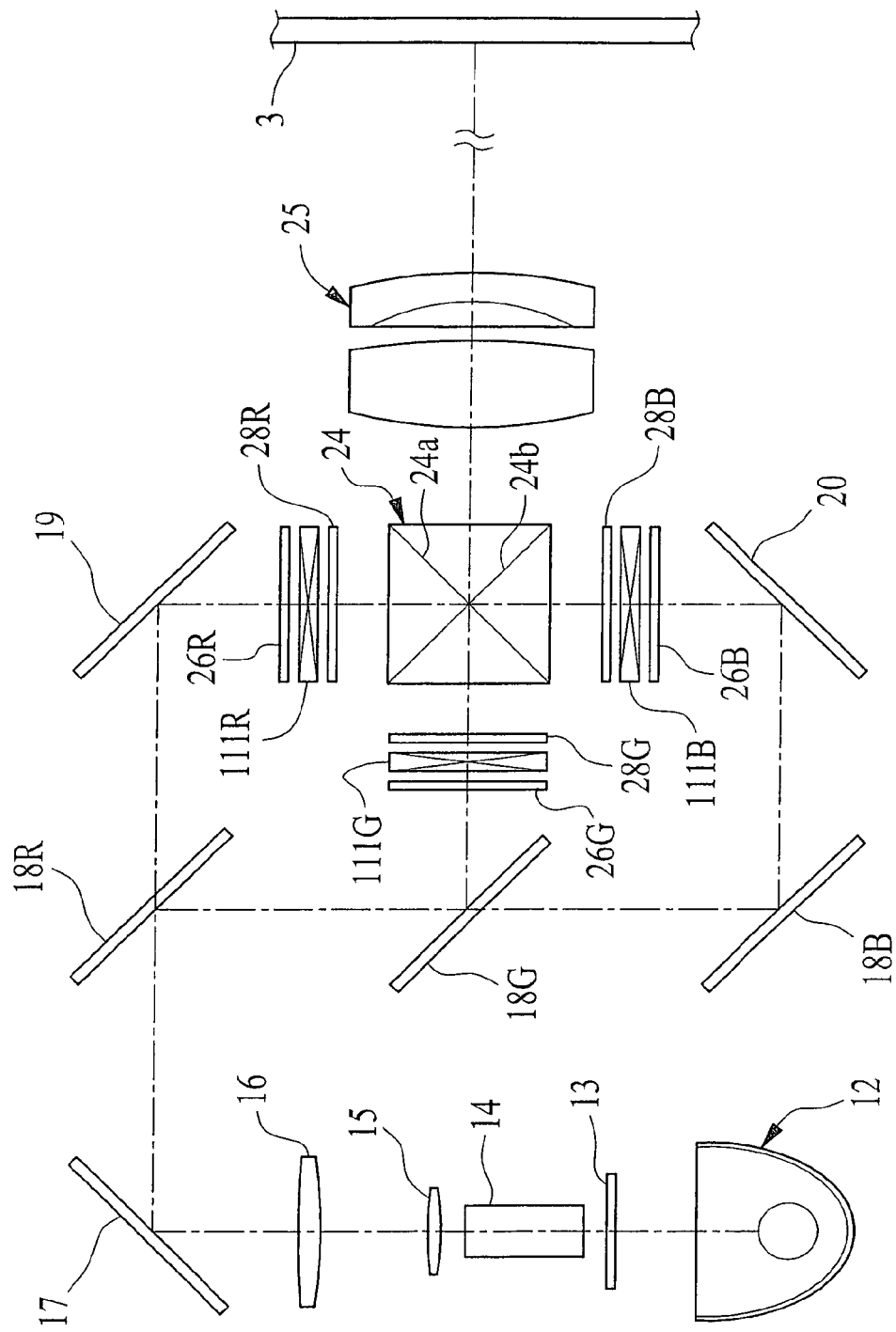
FIG. 8 is a block diagram showing an optical system of the liquid crystal projector in which the form birefringence layer is incorporated in a transmissive liquid crystal device.

An embodiment of the liquid crystal projector having such liquid crystal devices for red, green and blue 111R, 111G and 111B is depicted in FIG. 8. The liquid crystal projector shown in FIG. 8 has the same configuration as the embodiment shown in FIG. 2 except that the liquid crystal devices 111R, 111G and 111B. In addition, the embodiment shown in FIG. 8 does not include the retardation compensator 27R, 27G and 27B since the liquid crystal devices 111R, 111G and 111B contain the form birefringence layer. Thus, the detailed explanation of the common parts is omitted for the purpose of simplification.

Figure 9:
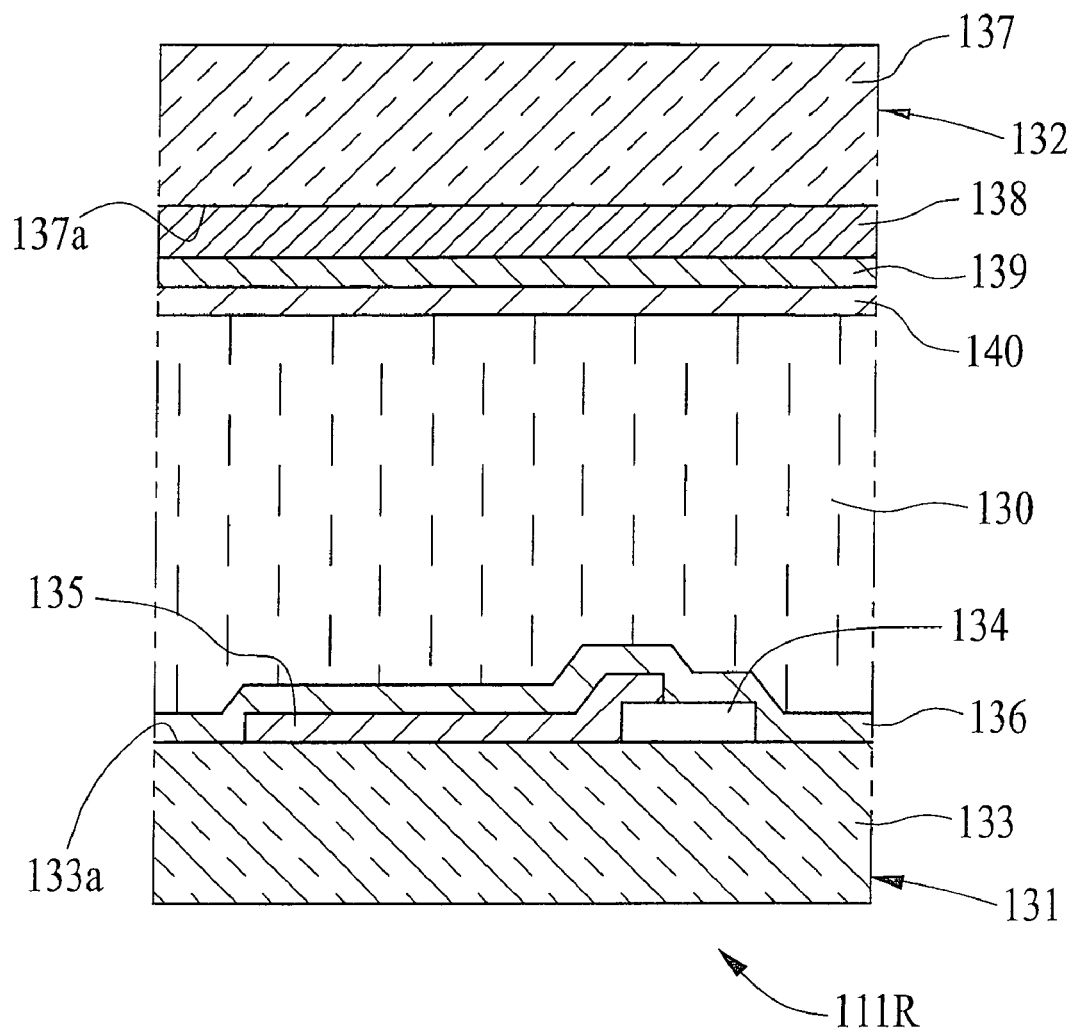
FIG. 9 is a schematic cross section of the transmissive liquid crystal device with the form birefringence layer.

As shown in FIG. 9, the liquid crystal device 111R is TFT (thin film transistor) active matrix type. The liquid crystal device 111R contains a liquid crystal layer 130 that is sandwiched by a pair of substrate 131, 132. The pixel electrode side substrate 131 of a single pixel comprises a transparent glass plate 133 as a substrate body, a thin film transistor 134, a transparent pixel electrode 135 and an orientation film 136. Plural pairs of the thin film transistor 134 and the pixel electrode 135 are arranged on the inner surface 133a of the glass plate 133 in a matrix. One pair of the thin film transistor 134 and the pixel electrode 135 corresponds to one red pixel. The orientation film 136 on the inner surface 133a covers the pairs of the film transistors 134 and the pixel electrodes 135. Note that a black matrix portion to separate the pixel electrodes 135 is formed in the pixel electrode side substrate 131, so that the contrast ratio of the pixel image increases.

The common electrode side substrate 132 comprises a transparent glass plate 137 as a substrate body, and a form birefringence layer 138, a transparent common electrode 139, an orientation film 140, which are formed on the glass plate 137 in the order listed.

The liquid crystal device 111R has the same configuration as a TFT type conventional liquid crystal device, except for the form birefringence layer 138. That is, the thin film transistor 134 controls the voltage applied to the liquid crystal layer 130 between the pixel electrode 135 and the common electrode 139, so that the light amount of emanation light through the polarizing plate 28R changes in accordance with the change in orientation of the liquid crystal molecules in the liquid crystal layer 130. Thereby, it is possible to control the density of the pixel image.

The form birefringence layer 138 may have the same configuration as the form birefringence layer used as the retardation compensator 27R in the first embodiment.

Retardation of elliptical polarized light changes in accordance with the incidence angle to the liquid crystal layer 130. Since the form birefringence layer 138 compensates the difference in retardation, an optical system having a large aperture value can be combined with the liquid crystal device without causing decrease in contrast ratio of the image. Thus, it is possible to reduce the size of the liquid crystal device, to adopt a lens element of large diameter to increase efficiency of incident light, to shorten the optical path length smaller for reducing the size of the liquid crystal projector, to make the optical system smaller to reduce the manufacture cost, and so forth.

The form birefringence layer 138 described above may be provided on the inner surface 137a, the outer surface of the glass plate 137 (opposite to the inner surface 137a) or the pixel electrode side substrate 131. The form birefringence layer 138 may be formed between the electrode and the orientation film. Moreover, it is possible to form a pair of the form birefringence layers 138 on both surfaces of the glass plate.

The structure of the substrates 131, 132 are not limited to the one illustrated in FIG. 9. FIGS. 10A to 10C and FIGS. 11A to 11C are examples of the structure of the pixel electrode side substrate 131. FIGS. 12A to 12C and FIGS. 13A to 13C are examples of the structure of the common electrode side substrate 132. Same reference numerals are used to the elements substantially the same as those in FIG. 9 for the purpose of omitting the explanation of those elements. Note that each example of the substrate has unique type name in order to simplify the explanation.

Figure 10A:
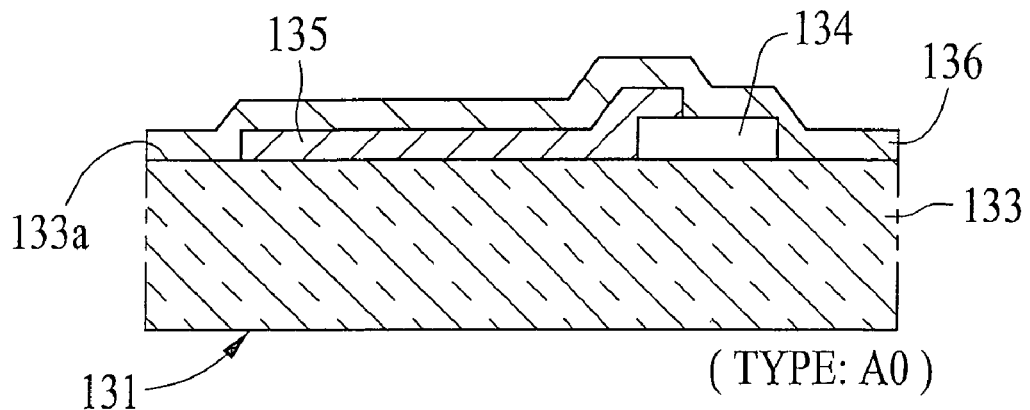
FIGS. 10A, 10B, 10C, 11A, 11B and 11C are schematic and partial cross sections showing examples of the liquid crystal device of pixel electrode side.
Figure 10B:
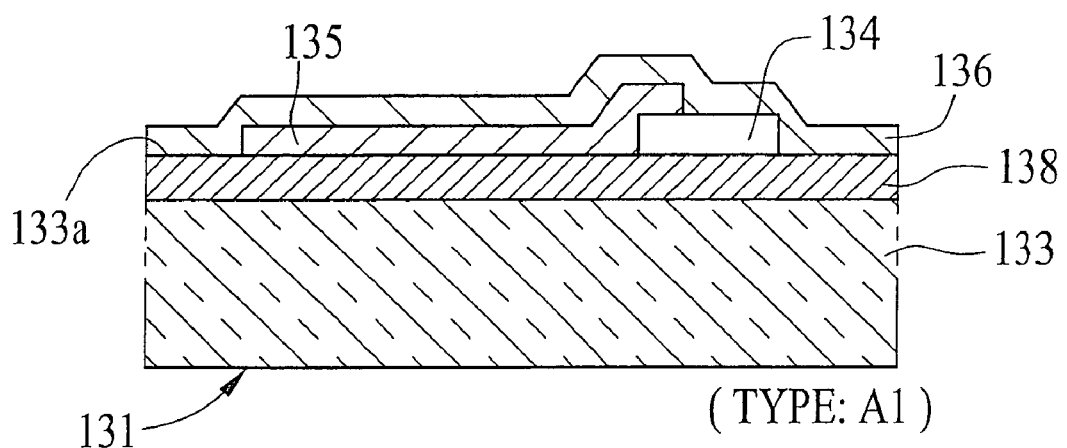
Figure 10C:
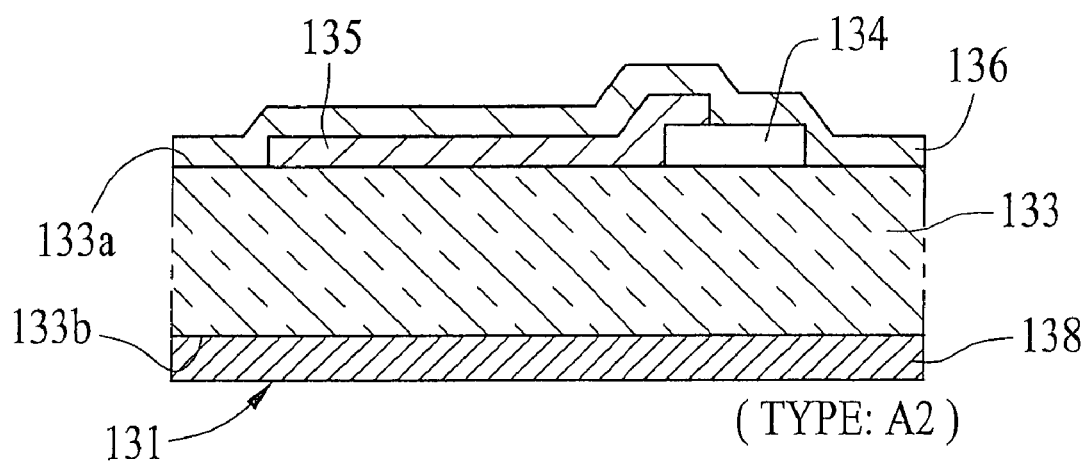

In FIG. 10A, the pixel electrode side substrate 131 of type A0 has the same construction as the one illustrated in FIG. 9. Since the pixel electrode side substrate 131 of type A0 does not have the form birefringence layer, the common electrode side substrate 132 with the form birefringence layer 138 is combined with the substrate 131 of type A0. The pixel electrode side substrate 131 of type A1, shown in FIG. 10B, has the form birefringence layer 138 on the inner surface 133a of the glass plate 133. The thin film transistor 134, the pixel electrode 135 and the orientation film 136 are formed on the form birefringence layer 138 in this order listed. As shown in FIG. 10C, the pixel electrode side substrate 131 of type A2 has the form birefringence layer 138 on the outer surface 133b of the glass plate 133. On the inner surface 133a of the glass plate 133, the thin film transistor 134, the pixel electrode 135 and the orientation film 136 are formed in this order.

Figure 11A:
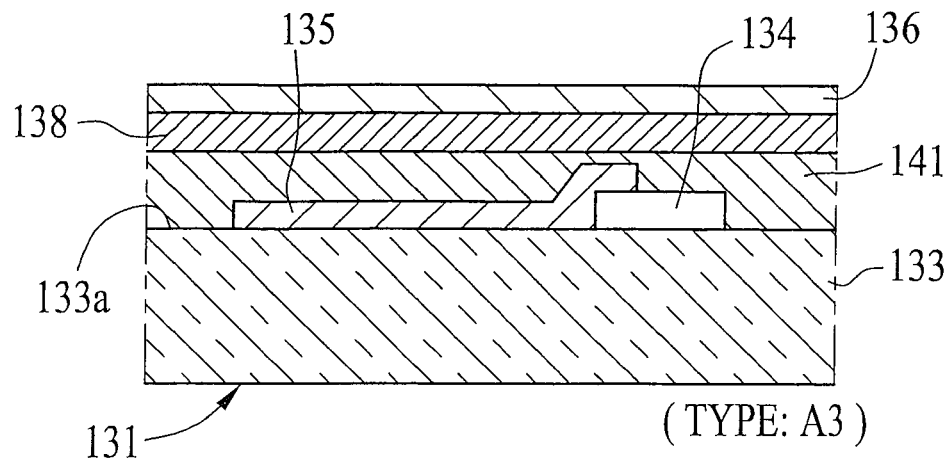
Figure 11B:
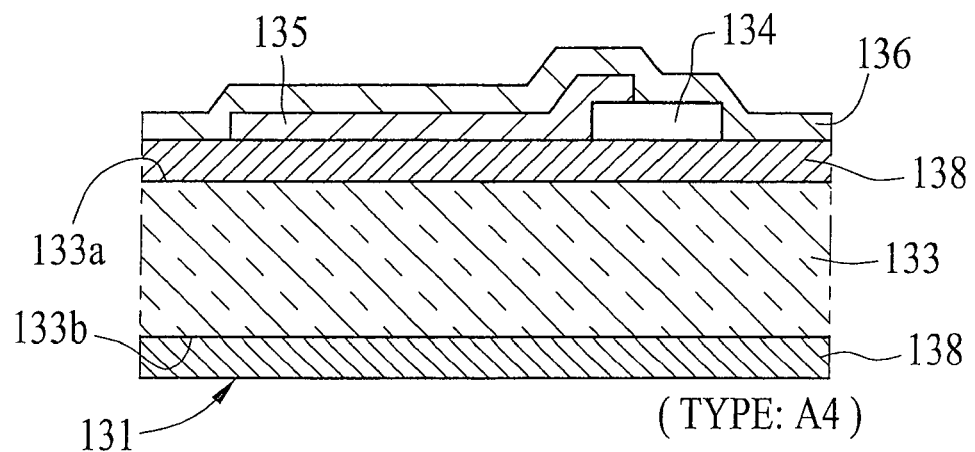
Figure 11C:
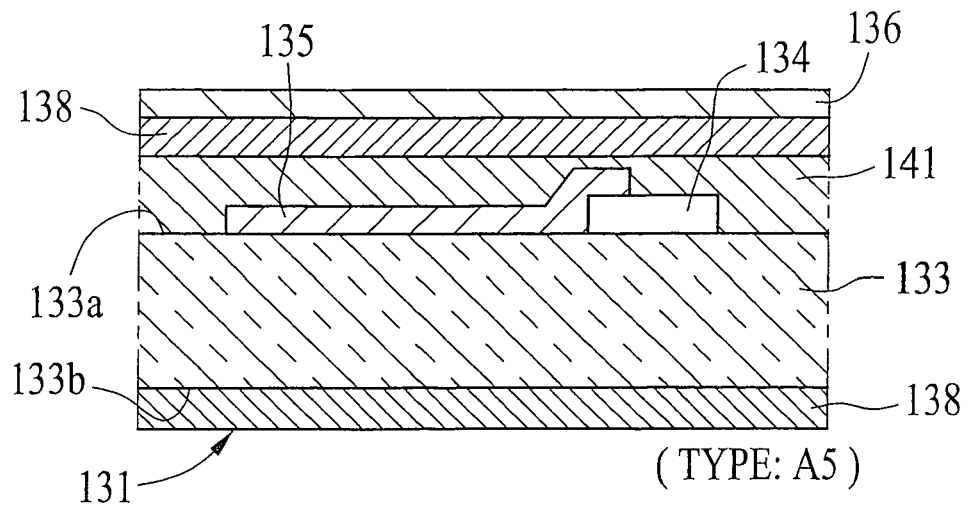

The pixel electrode side substrate 131 of type A3, as shown in FIG. 11A, has the form birefringence layer 138 between the pixel electrode 135 and the orientation film 136. The pixel electrode side substrate 131 of type A3 is prepared by forming a transparent planarization layer 141 ($SiO_2$ layer, for instance) on the thin film transistor 134 and the pixel electrode 135, and then by forming the form birefringence layer 138 on the planarization layer 141. The orientation film 136 is formed on the form birefringence layer 138. As shown in FIG. 11B, the pixel electrode side substrate 131 of type A4 has two form birefringence layers 138 on both surfaces of the glass plate 133. The pixel electrode side substrate 131 of type A5, shown in FIG. 11C, has the same structure as the substrate of type A3 (see FIG. 11A) in the inner surface side of the glass plate 133. In addition, the form birefringence layer 138 is formed on the outer surface 133b of the glass plate 133 as well as the inner surface side thereof.

In order to control the density of each pixel, the pixel electrodes 135 must be electrically isolated from one another. The form birefringence layer 138, formed from a dielectric material (insulator), does not connect the separated pixel electrodes 135 even though the form birefringence layer 138 is in contact with the pixel electrodes 135.

Figure 12A:
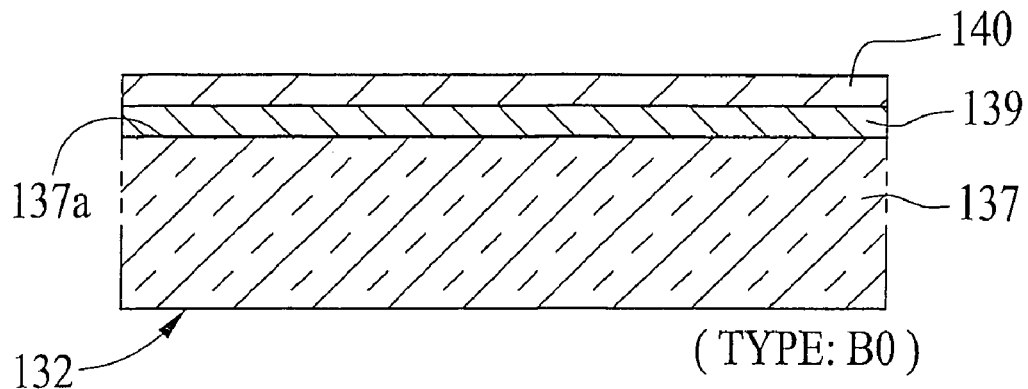
FIGS. 12A, 12B, 12C, 13A, 13B and 13C are schematic and partial cross sections showing examples of the liquid crystal device of common electrode side.
Figure 12B:
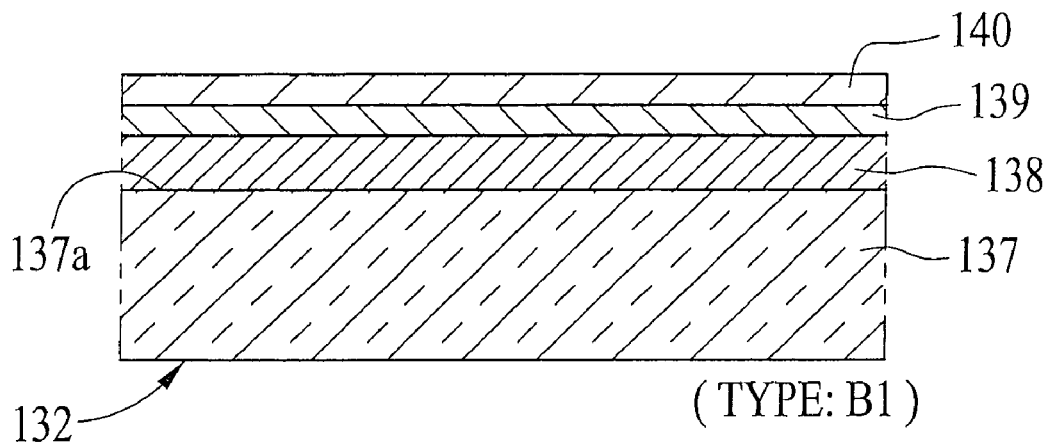
Figure 12C:
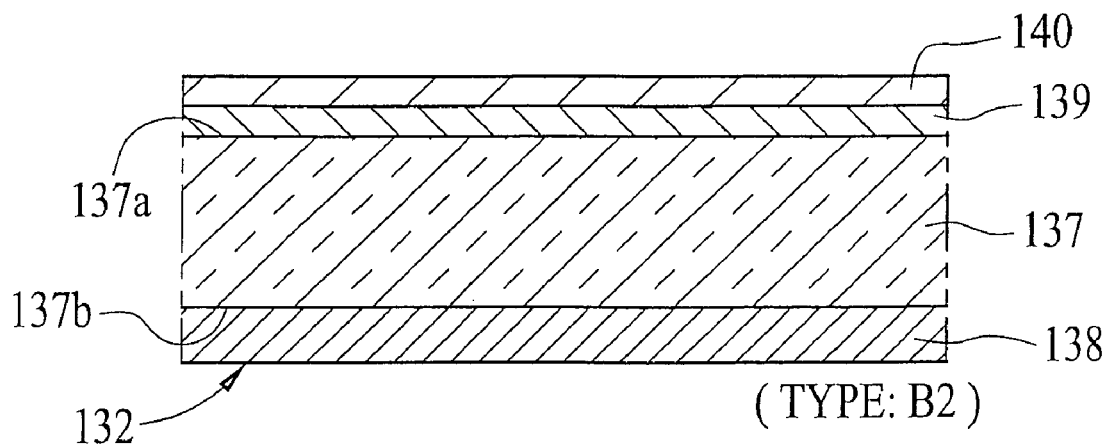

As shown in FIG. 12A, the common electrode side substrate 132 of type B0 does not have the form birefringence, so the pixel electrode side substrate 131 with the form birefringence layer 138 is combined with the common electrode side substrate 132 of type B0. As shown in FIG. 12B, the common electrode side substrate 132 of type B1 has the same structure as the one shown in FIG. 12A, and has the form birefringence layer 138 on the inner surface 137a of the glass plate 137. The common electrode 139 and the orientation film 140 are formed on the form birefringence layer 138. The common electrode side substrate 132 of type B2, shown in FIG. 12C, has the common electrode 139 and the orientation film 140 in the inner surface side of the glass plate 137, and has the form birefringence layer 138 on the outer surface 137b.

Figure 13A:
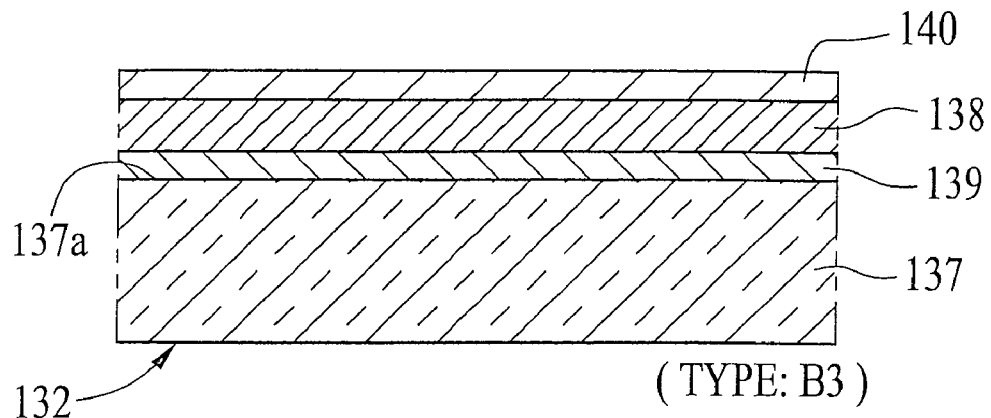
Figure 13B:
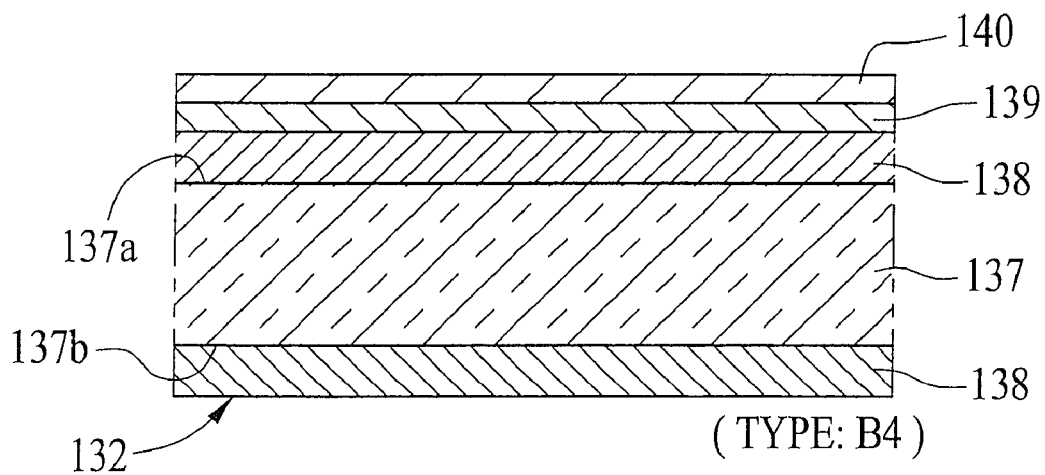
Figure 13C:
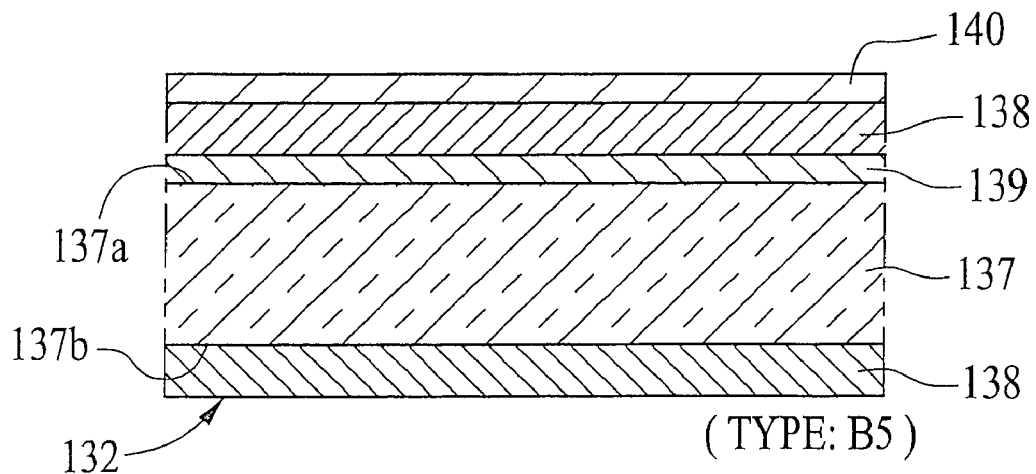

In FIG. 13A, the common electrode side substrate 132 of type B3 has the form birefringence layer 138 between the common electrode 139 and the orientation film 140. After forming the common electrode 139 on the inner surface 137a of the glass plate 137, the form birefringence layer 138 is formed on the common electrode 139. Then, the orientation film 140 is formed on the form birefringence layer 138. The common electrode side substrate 132 of type B4, shown in FIG. 13B, has two form birefringence layers 138 on both inner surface 137a and the outer surface 137b. The common electrode 139 and the orientation film 140 are formed in the inner surface 137a side. As shown in FIG. 13C, the common electrode side substrate 132 of type B5 has the common electrode 139, the form birefringence layer 138 and the orientation film 140 in the inner surface side of the glass plate 137. In addition, the common electrode side substrate 132 of type B5 has the form birefringence layer 138 on the outer surface 137b.

Figure 14:
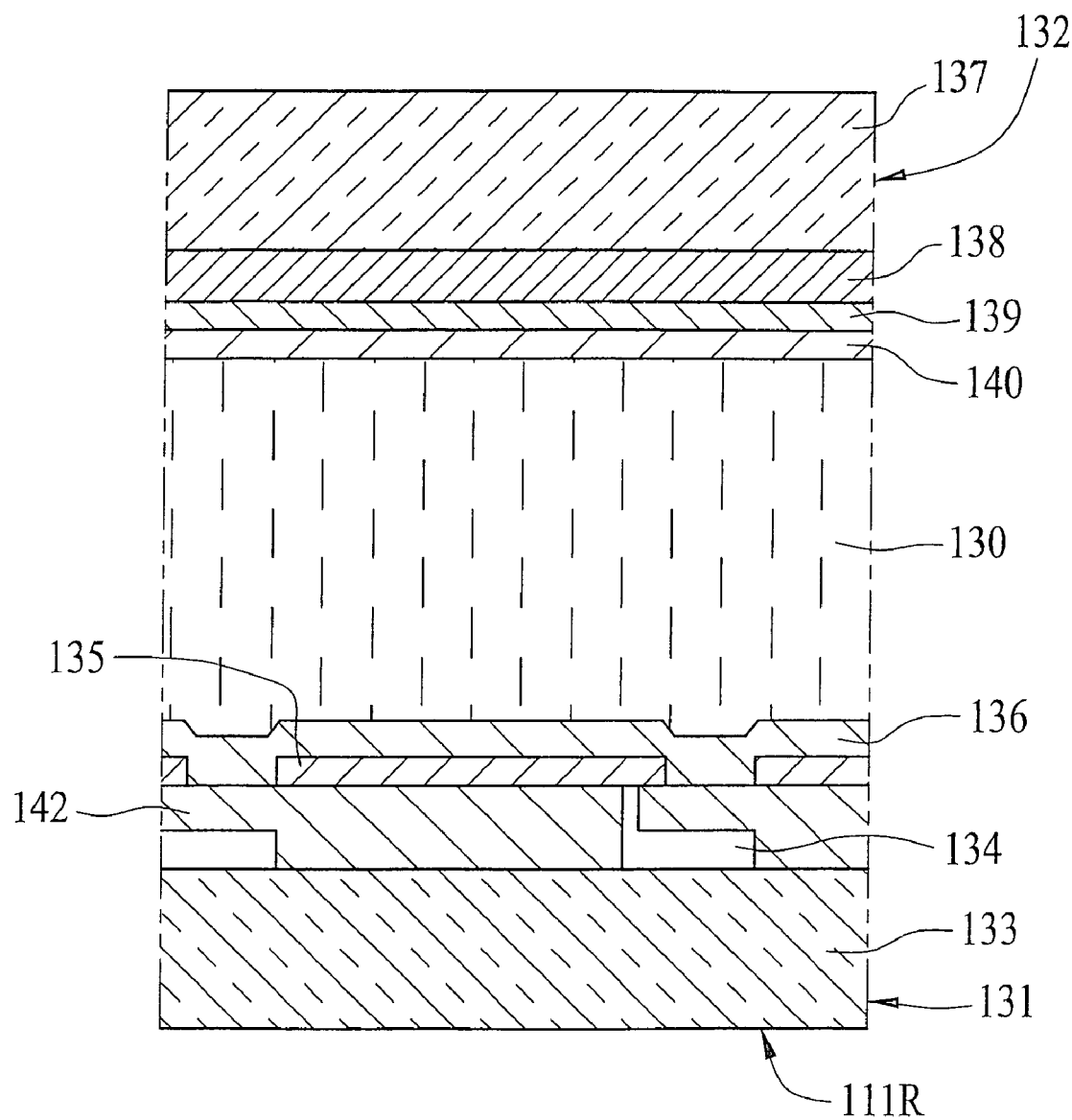
FIG. 14 is a schematic cross section of the liquid crystal device with a insulation layer.

Besides the layers described above, the substrates 131, 132 may have other layers such as the black matrix portion and an insulation layer. For instance, an insulation layer 142 is formed between the thin film transistor 134 and the pixel electrode 135, as shown in FIG. 14. It is possible to form the form birefringence layer on the substrate having the insulation layer 142.

The characteristics (manufacture cost, bend adjustment, retardation compensation) of the combination of the substrates 131, 132 are shown in Table 1.

TABLE 1

| Comb. no | Number of structural birefringence layer | | Cost | Bend adjustment | Retardation compensation |
|---|---|---|---|---|---|
| | Common side | Pixel side | | | |
| 1 | 1 | 0 | 1 | Hard | Good |
| 2 | 2 | 0 | 2 | Good | Good |
| 3 | 0 | 1 | 1 | Hard | Good |
| 4 | 1 | 1 | 2 | Possible | Excellent |
| 5 | 2 | 1 | 3 | Good | Excellent |
| 6 | 0 | 2 | 2 | Good | Good |
| 7 | 1 | 2 | 3 | Good | Excellent |
| 8 | 2 | 2 | 4 | Excellent | Excellent |

In Table 1 above, the number "2" in the common side column shows that the form birefringence layers are formed on both surfaces of the glass plate of the common electrode side. The number "1" in the common side column shows that the form birefringence is formed on one surface of the glass plate. The number "0" in the common side column shows that no form birefringence is formed on the glass plate. The value in the "cost" column is increased as manufacture cost increases. The "bend adjustment" column shows the degree to adjust the bend of the substrates 131, 132. The bend of the substrates 131, 132 is precisely adjusted in the order of "Excellent", "Good", "Possible", and "Hard".

The combination of the substrates 131, 132 corresponding to the combination number is shown in Table 2. The number in Table 2 indicates the combination number shown in Table 1.

TABLE 2

| Type of pixel electrode side substrate | Type of common electrode side substrate | | | | | |
|---|---|---|---|---|---|---|
| | B0 | B1 | B2 | B3 | B4 | B5 |
| A0 | — | 1 | 1 | 1 | 2 | 2 |
| A1 | 3 | 4 | 4 | 4 | 5 | 5 |
| A2 | 3 | 4 | 4 | 4 | 5 | 5 |
| A3 | 3 | 4 | 4 | 4 | 5 | 5 |
| A4 | 6 | 7 | 7 | 7 | 8 | 8 |
| A5 | 6 | 7 | 7 | 7 | 8 | 8 |

If the temperature of the liquid crystal device for the projector increases by illumination of strong light, the characteristic of the contrast ratio changes due to thermal expansion of the liquid crystal molecules and deviation in birefringence. If the substrate is largely bent at a high temperature, the uniformity of the contrast ratio over the liquid crystal layer is disturbed. Thus, it is necessary to control the bend of the substrate for the liquid crystal projector in consideration of the thermal fluctuation.

Referring to Table 1, it has found that at least one form birefringence layer on the substrates 131, 132 is preferable in terms of retardation compensation. For the purpose of controlling the bend of the substrates 131, 132, it is preferable to provide two form birefringence layers with both surfaces of at least one of the substrates. More preferably, form birefringence layers are provided on both surfaces of each substrate.

The pixel electrode side substrate 131 of type A3, A5 and the common electrode side substrate 132 of type B3, B5 have the form birefringence layer 138 between the electrode and glass plate (substrate body). Such arrangement is preferable in insulating the electrodes because the form birefringence layer 138 is formed from a dielectric material. The substrates with such arrangement, however, have the following disadvantage.

For the purpose of connecting the electrode to an outer electrical circuit, the liquid crystal device must have an electrode area, outside the image display area, in which the electrode is not covered with the form birefringence layer. Such electrode area may be formed by the photolithography and etching processes to remove the form birefringence layer partially, or by the mask deposition process not to form the form birefringence layer in the area to expose the electrode. However, it is difficult to form the electrode area by the photolithography and etching processes, because two kinds of thin films in the form birefringence layer have different etching characteristics. In forming the electrode area by the mask deposition process, the deposition conditions needs to change in accordance with the design of the liquid crystal device. Moreover, in case of forming the form birefringence layer between the pixel electrode and the common electrode, it is necessary to consider that the applied voltage to the liquid crystal layer changes in accordance with the capacitance of the form birefringence.

The pixel electrode side substrate 131 of type A1, A3, A4, A5 and the substrate of type B1, B3, B4, B5 have the form birefringence layer 138 on the inner surface of the glass plate. In that case, both surfaces of the form birefringence layer 138 are in contact with the materials having refractive indices more than that of air, so the reflectance at the interface is higher than that at the interface between air and the retardation compensator. Thus, the form birefringence layer 138 on the inner surface has the advantageous in removing the anti-reflection layer and in preventing a flaw on the form birefringence layer 138.

When the pixel electrode side substrate 131 of type A2, A4, A5 and the substrate of type B2, B4, B5 are used for the liquid crystal device, the form birefringence layer 138 on the outer surface of the glass plate may be covered with a transparent protection layer.

Since the liquid crystal device has the form birefringence layer on the glass plate (the substrate), the incidence angle of incident light to the liquid crystal layer and the form birefringence layer become the same. Thus, it is possible to compensate the retardation effectively, compared with the liquid crystal device in which the form birefringence layer and the substrate are separated. Moreover, compared with a retardation compensator formed from a polymer, it is easier to form the inorganic form birefringence layer with high resistance to heat or ultraviolet light in the liquid crystal device.

Figure 15:
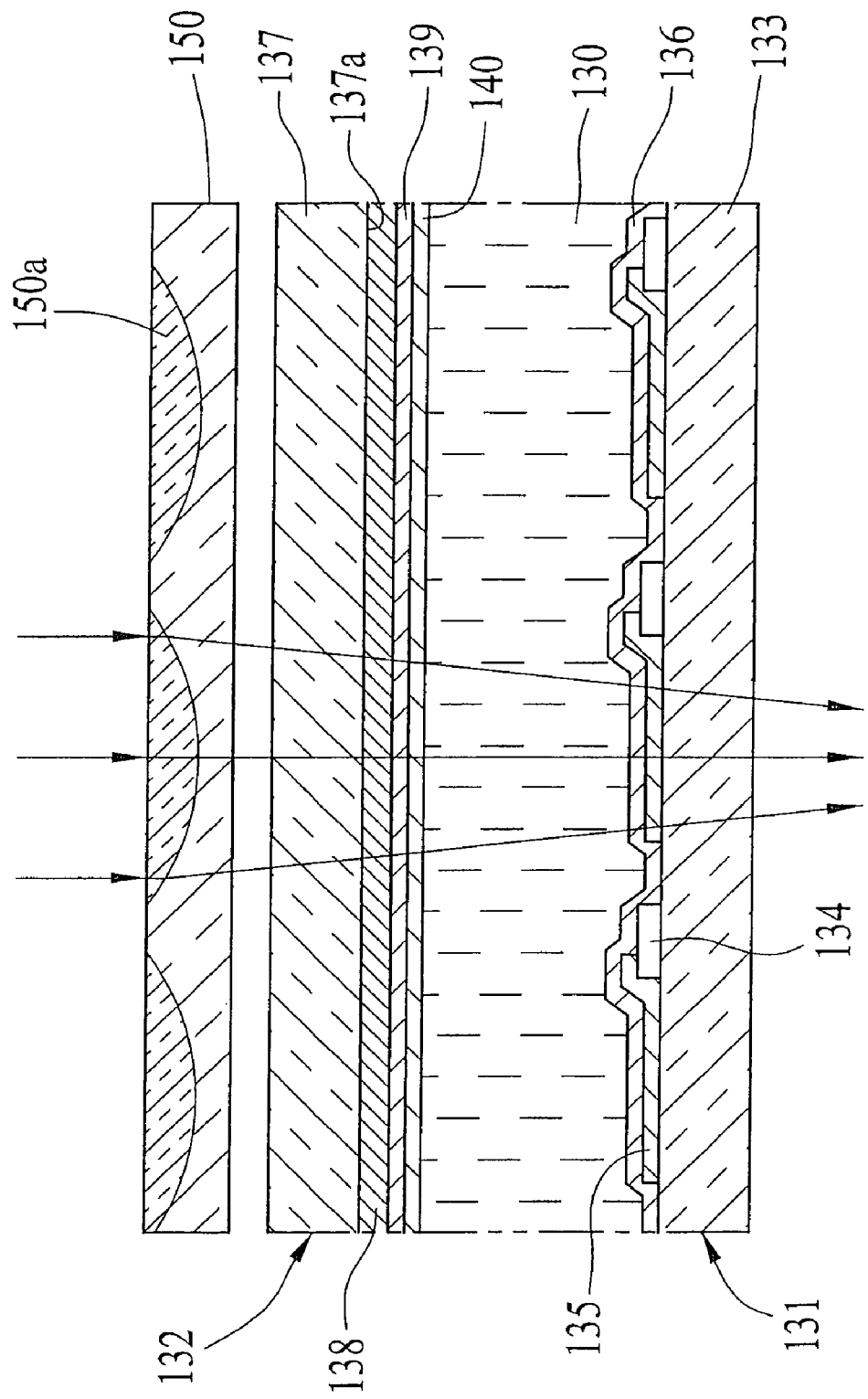
FIGS. 15, 16 are schematic cross sections showing examples of the transmissive liquid crystal device with the retardation compensators and a micro lens array.

The liquid crystal device may be combined with a micro lens array. In an example shown in FIG. 15, the liquid crystal device has a micro lens array 150 in the incidence plane side. The micro lens array 150 consists of plural micro lenses 150a each of which corresponds to one pixel. The micro lens 150a may be formed by making refractive index distribution in a glass plate by use of ion exchange technique. Alternatively, the micro lens 150a is prepared by changing the shape of a glass or resin plate into a lens element. The micro lens 150a can concentrate incidence light to compensate the decrease in aperture ratio that is caused by the black matrix portion (not illustrated) to divide the pixel electrodes 135.

Linearly polarized incidence light, concentrated by the micro lens array 150, reaches the liquid crystal layer 130 through the glass plate 137, the form birefringence layer 138, the common electrode 139 and the orientation film 140. Then, linearly polarized light passes the orientation film 136, the pixel electrode 135, the glass plate 133 and the polarizing plate as the analyzer. In this example, the form birefringence layer 138 to compensate the retardation of obliquely incident light is effectively combined with the micro lens array 150, since incident light obliquely enters the liquid crystal layer 130 by the micro lens 150a.

Figure 16:
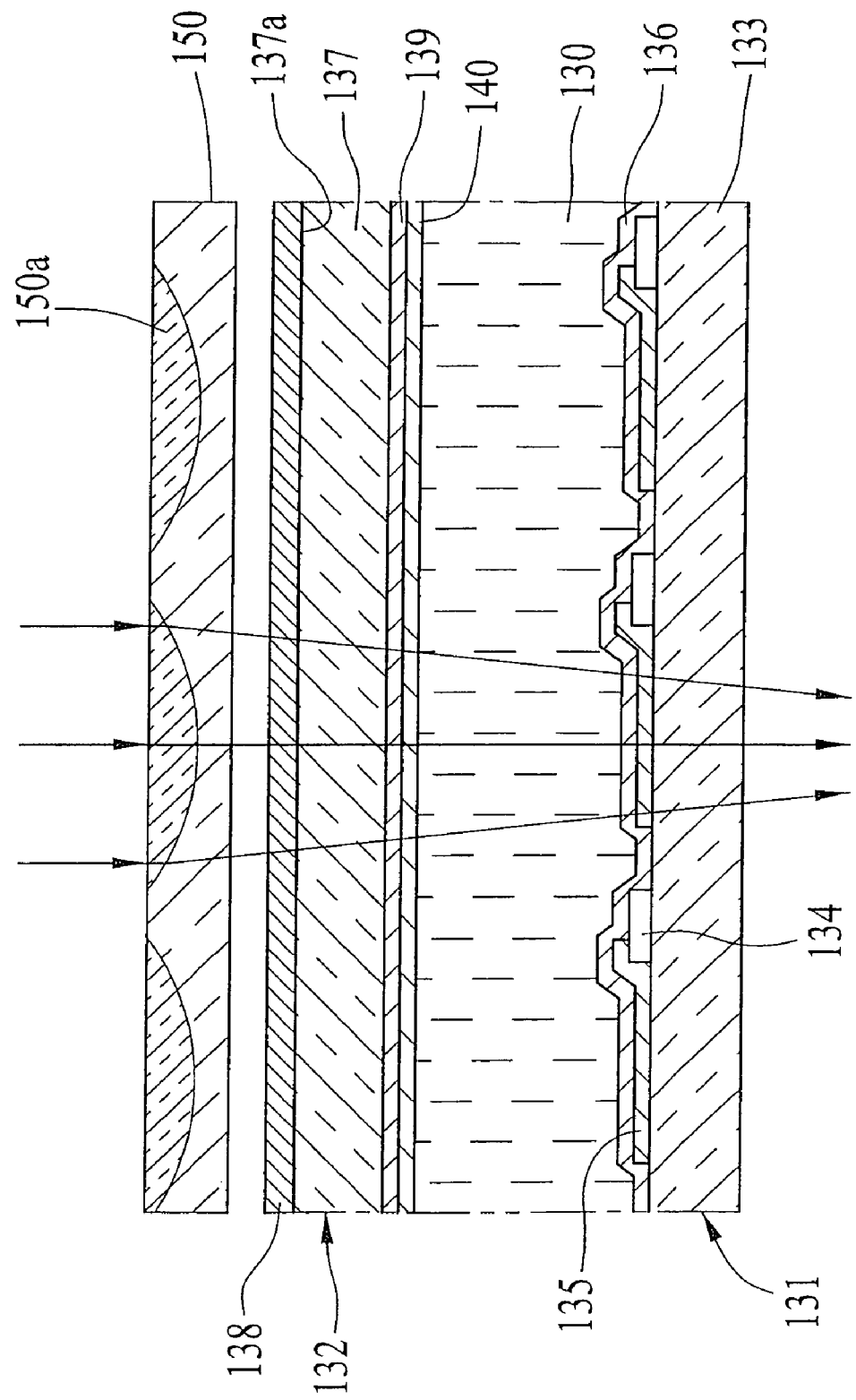

FIG. 16 shows another example of the liquid crystal device combined with the micro lens array 150. In this example, the form birefringence layer 138 is formed on the outer surface 137b of the glass plate 137. The micro lens array 150 may be combined with the substrates 131 of type A0 to A5 and the substrates 132 of type B0 to B5.

A sample of the transmissive liquid crystal device is prepared by the following processes. First, the form birefringence layer is formed by depositing 46 $TiO_2$ layers and 46 $SiO_2$ layers alternatively on the glass substrate by the electron beam deposition method. The thickness of each layer is 15 nm. The thickness of the glass plate is 0.7 mm. The form birefringence layer has the thickness of 1.38 μm, and exhibits negative birefringence with retardation of 310 nm to sample light having the wavelength of 550 nm. An ITO (indium tin oxide) layer of 100 nm in thickness is deposited on the form birefringence layer to form the common electrode. Then, the orientation film on the ITO layer is formed by rubbing the surface of a polyimide resin film for orientation film, so that the common electrode side substrate is prepared.

The pixel electrode side substrate is prepared by forming the rubbed polyimide orientation film on the glass plate (0.7 mm in thickness) with the pixel electrode array. The common electrode side substrate is bonded to the pixel electrode side substrate such that the rubbed directions of the orientation films are perpendicular to each other. Lastly, the liquid crystal with positive dielectric anisotropy is injected between the substrates, and the micro lens array is attached on the outer surface of the substrate. Thereby, TN type liquid crystal device is produced.

The contrast ratio between the brightest pixel and the darkest pixel of the reflective liquid crystal device has improved to 550:1, compared with the contrast ratio of the liquid crystal device without the form birefringence layer (350:1).

Figure 17:
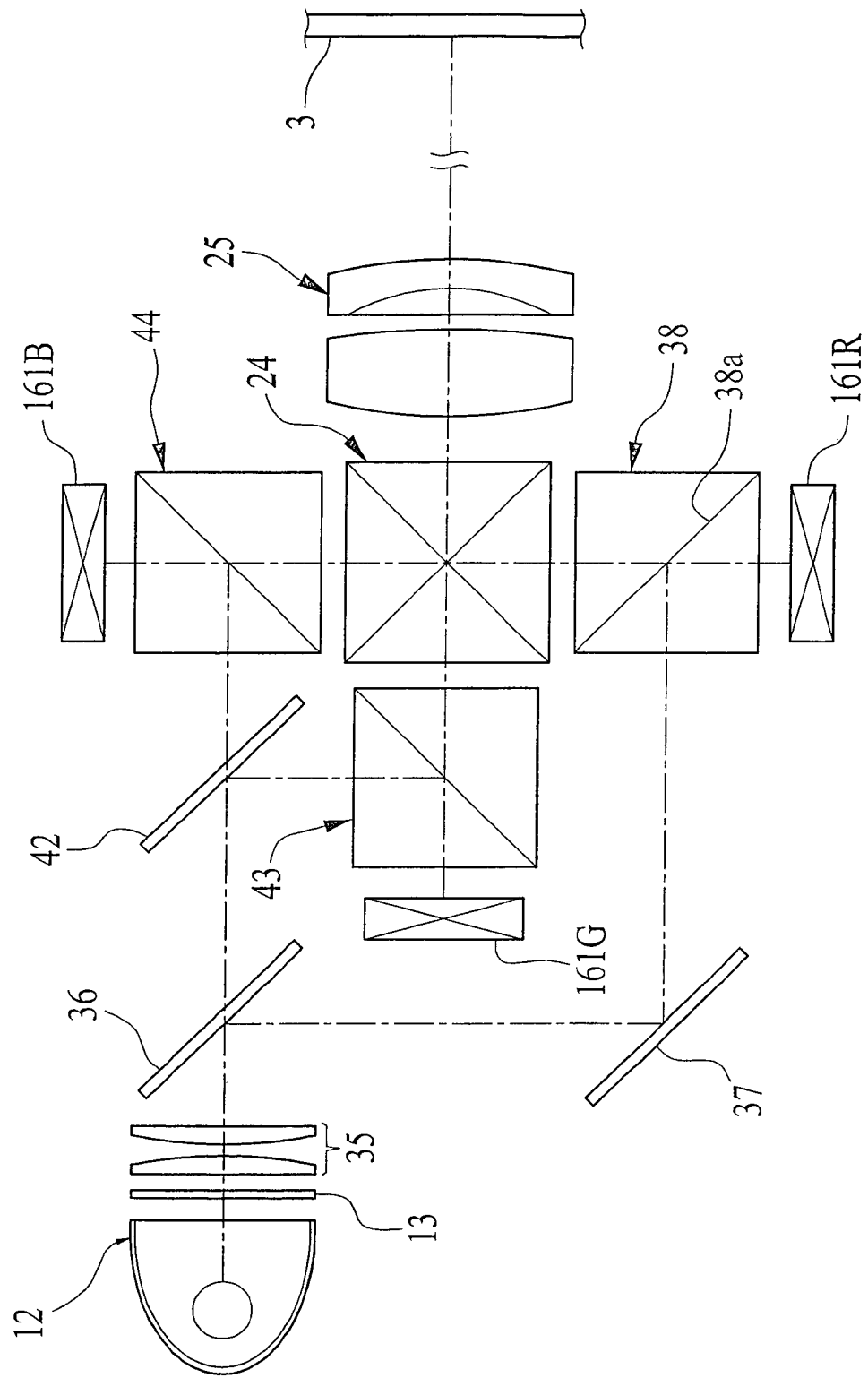
FIG. 17 is a block diagram showing an optical system of the liquid crystal projector in which the form birefringence layer is incorporated in a reflective liquid crystal device.

The form birefringence layer is applicable to not only the transmissive liquid crystal projector but the reflective liquid crystal projector. As shown in FIG. 17, incident light from the light source 12 is changed into white light by the cut filter 13. White light including red, green and blue light goes through the focusing optical system 35 and reaches the dichroic mirror 36 on which only red light is reflected. Red light reflected on the dichroic mirror 36 and the mirror 37 enters the polarization beam splitter 38 having the polarization plane 38a. The polarization plane 38a changes the s-polarization component of red incident light into linearly polarized light, and reflects linearly polarized light toward a reflective liquid crystal device 161R. Note that the same reference numerals are used for the elements substantially the same as those in the above embodiments.

Similarly, green light through the dichroic mirror 36 is reflected on the dichroic mirror 42 toward a polarization beam splitter 43, so that linearly polarized green light enters a reflective liquid crystal device 161G. Blue light through the dichroic mirror 42 enters the polarization beam splitter 44, in which linearly polarized blue light is reflected toward a reflective liquid crystal device 161B.

Figure 18:
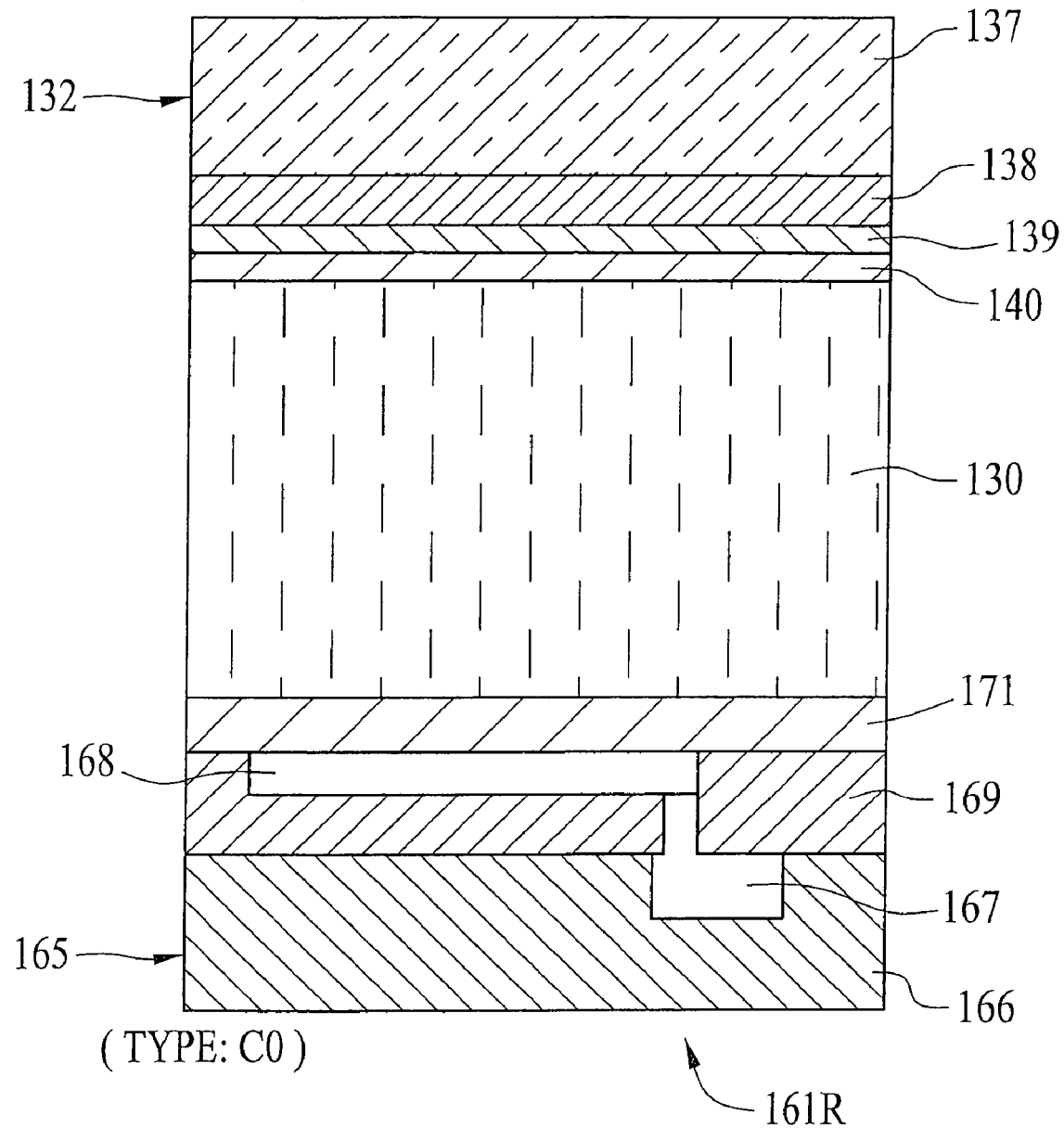
FIG. 18 is a schematic cross section of the reflective liquid crystal device.

In FIG. 18, an example of the reflective liquid crystal device 161R has the liquid crystal layer 130 between a pair of substrates 132, 165. The common electrode side substrate 132 of type B1 is the same as that described above. The substrate 165 of type C0 comprises an opaque silicon layer 166 as the substrate body, a pixel circuit 167 and a pixel electrode 168 of each pixel. The pixel circuit, formed in the silicon layer 166, is electrically connected to the pixel electrodes 168 to control the voltage to the liquid crystal layer 130. The pixel electrode 168 is formed from a material with high reflectivity, such as aluminum and silver, to reflect light through the liquid crystal layer 130. An insulation layer 169 is formed between the silicon layer 166 and the pixel electrode 168. An orientation film 171 is provided on the pixel electrode 168 so as to cover the pixel electrode 168 and the insulation layer 169.

Polarized light through the form birefringence layer 138 and the liquid crystal layer 130 is reflected on the pixel electrode 168. After passing the liquid crystal layer 130 and the form birefringence layer 138 again, polarized light enters the polarization beam splitter 38. Since p-polarization component of red light is linearly polarized with respect to the polarization plane 38a, linearly polarized light can pass the polarization plane 38a and enters the color recombining prism 24. When a voltage is applied to the pixel in the liquid crystal device 41R, the liquid crystal molecules changes the polarization direction of linearly polarized light so as to decrease the density of the pixel image on the screen 3. The structure and the function of the color recombining prism 24 and the projection lens system 25 are the same as those in the transmissive liquid crystal projector.

In determining the retardation characteristic of the form birefringence layer 138, it is necessary to consider that polarized light passes the form birefringence layer 138 twice. The reflective liquid crystal device may be located at the off-axis position (see FIGS. 6A, 6B for example).

Figure 19:
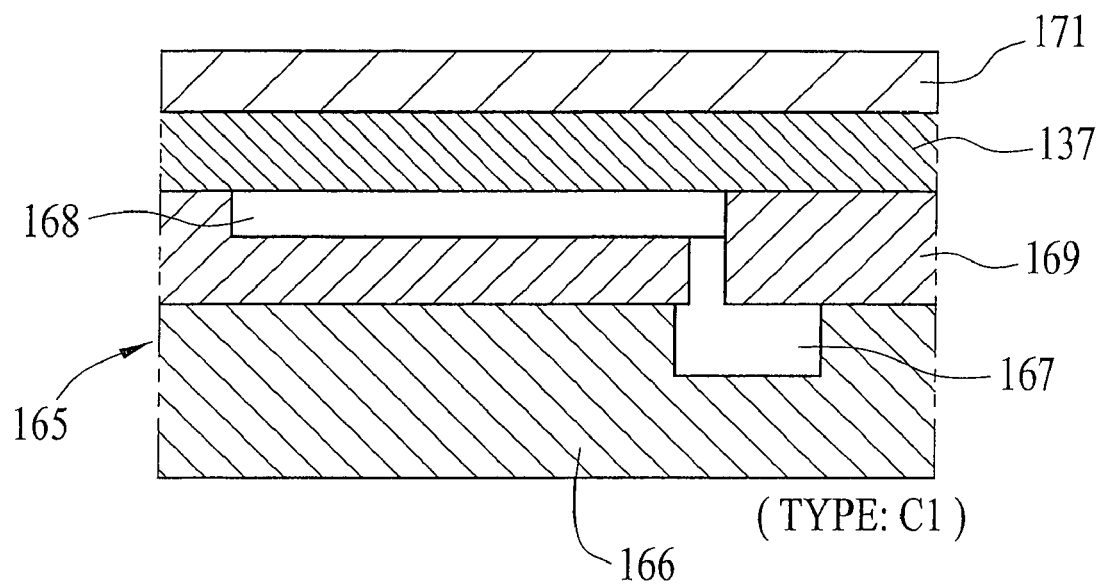
FIG. 19 is a schematic and partial cross section of the liquid crystal device of FIG. 18, in which the form birefringence layer is formed on a silicon substrate.

The substrate 165 of pixel electrode side may have the form birefringence layer 138, as shown in FIG. 19. In this example, the form birefringence layer 138 is formed between the pixel electrode 168 and the orientation film 171. It is also possible to combine the substrate 165 of type C0, C1 (see FIGS. 18, 19) with the common electrode side substrate 132 of type B0 to B5. Note that the substrate 165 of FIG. 18 is not combined with the common electrode side substrate 132 of type B0, because this combination does not include the form birefringence layer 138.

The characteristics (manufacture cost, bend adjustment, retardation compensation) of the combination of the pixel electrode side substrate 165 and the common electrode side substrate 132 are shown in Table 3. Note that "type C0" indicates the pixel electrode side substrate 165 shown in FIG. 18, and that "type C1" indicates the pixel electrode side substrate 165 shown in FIG. 19.

TABLE 3

| Comb. no | Number of structural birefringence layer Common side | Number of structural birefringence layer Pixel side | Cost | Bend adjustment | Retardation compensation |
|---|---|---|---|---|---|
| 1 | 1 | 0 | 1 | Hard | Passable/Bad |
| 2 | 2 | 0 | 2 | Good | Passable |

TABLE 3-continued

| Comb. no | Number of structural birefringence layer Common side | Number of structural birefringence layer Pixel side | Cost | Bend adjustment | Retardation compensation |
|---|---|---|---|---|---|
| 3 | 0 | 1 | 1 | Hard | Passable/Bad |
| 4 | 1 | 1 | 2 | Possible | Good |
| 5 | 2 | 1 | 3 | Good | Passable |

Note that evaluation in "retardation compensation" column is classified in the order of "Good", "Passable" and "Bad". The combination of the substrates 131, 132 corresponding to the combination number is shown in Table 4. The number is Table 2 indicates the combination number shown in Table 1.

TABLE 2

| Type of pixel electrode side substrate | Type of common electrode side substrate | | | | | |
|---|---|---|---|---|---|---|
| | B0 | B1 | B2 | B3 | B4 | B5 |
| A0 | — | 1 | 1 | 1 | 2 | 2 |
| A1 | 3 | 4 | 4 | 4 | 5 | 5 |

The reflective liquid crystal device may be prepared by attaching a reflection plate on one side of the transmissive liquid crystal device.

The sample of reflective liquid crystal device is manufactured by the following way. First, the pixel electrode side substrate is prepared by forming the rubbed polyimide orientation film for vertical orientation on the silicon layer with the pixel electrodes. Then, the common electrode side substrate is prepared by forming the form birefringence layer and the ITO (indium tin oxide) layer as the common substrate on the glass plate, and forming the rubbed polyimide orientation film for vertical orientation on the ITO layer. The physical characteristics of the glass plate, the form birefringence layer and the ITO layer are the same as those of the transmissive liquid crystal device. The common electrode side substrate is bonded to the pixel electrode side substrate such that the rubbed directions of the orientation films are perpendicular to each other. Lastly, the liquid crystal with negative dielectric anisotropy is injected between the substrates, so that the liquid crystal device of VA (vertical alignment) type is produced.

The contrast ratio between the brightest pixel and the darkest pixel of the reflective liquid crystal device has improved to 900:1, compared with the contrast ratio of the liquid crystal device without the form birefringence layer (500:1).

Figure 20:
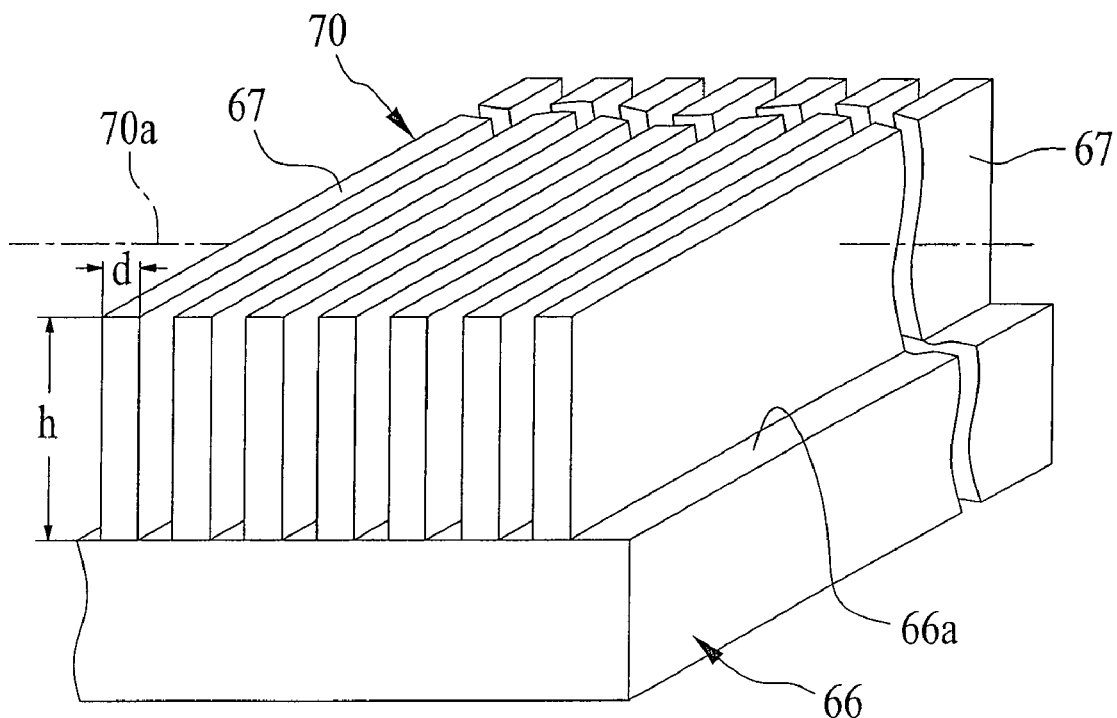
FIGS. 20, 21, 22, 23 and 24 are partial perspective views of examples of a form birefringence layer.

The liquid crystal projector in the present invention may have various types of inorganic form birefringence layers as the retardation compensator or the form birefringence layers other than the plural thin films (see FIG. 3). The retardation compensator shown in FIG. 3 is an example of the negatively uniaxial birefringent c-plate with its optical isotropic axis perpendicular to the surface of the glass substrate. As shown in FIG. 20, it is possible to utilize a form birefringence layer 70 with plural transparent ridges 67 arranged on the top surface of the glass substrate 66 (opaque silicon substrate in the reflective liquid crystal device). Each ridge 67 has a substantially rectangular parallelepiped shape.

The thickness d, the height h and the gap between adjacent two ridges 67 are sufficiently smaller than the wavelength $\lambda$ of incident light. For instance, the optical thickness of the form birefringence layer 70 is preferably from $\lambda/100$ to $\lambda/5$, more preferably from $\lambda/50$ to $\lambda/5$, and practically from $\lambda/30$ to $\lambda/10$. The optical isotropic axis 70a with no optical anisotropy extends in the direction parallel to the top surface 66a of the glass substrate 66. The form birefringence layer 70 exhibits the optical characteristics as a-plate, and located such that the top surface 66a of the glass plate 66 is perpendicular to the illumination or projection axis. The arrangement of the ridges 67 causes the refractive index distribution by air and the ridge 67 along the direction parallel to the optical isotropic axis 70a.

Figure 21:
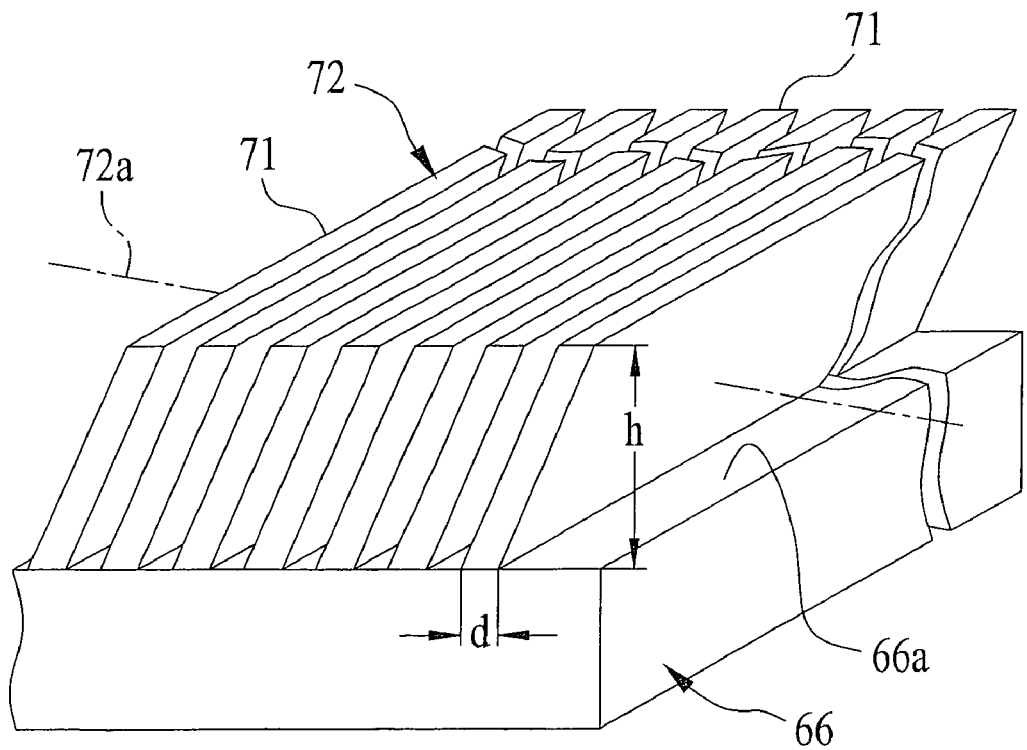

The ridges on the glass substrate may not be perpendicular to the glass substrate. FIG. 21 shows an example of a form birefringence layer 72 with plural transparent ridges 71 that are inclined to the top surface 66a of the glass substrate 66. The optical isotropic axis 72a extends in the direction oblique to the top surface 66a of the glass substrate 66. The arrangement of the ridges 71 yields one-dimensional refractive index distribution by air and the ridge 71 within the plane perpendicular to the illumination or projection axis. The form birefringence layer 72 is located such that the top surface 66a of the glass plate 66 is perpendicular to the illumination or projection axis. Thus, the form birefringence layer 72 exhibits optical characteristics of a negatively uniaxial birefringent o-plate with its optical isotropic axis oblique to the top surface 66a of the glass substrate 66.

The ridges 67, 71 shown in FIGS. 20, 21 are formed by photo lithography and etching processes. Note that the aspect ratio of the height h of the ridge 67, 71 to the width d thereof needs to be sufficiently large in order to obtain the negatively uniaxial birefringent effect. If the aspect ratio is not large enough, the form birefringence layer 70, 72 becomes a biaxial birefringence body in which the refractive indices ($n_x$, $n_y$, $n_z$) in the refractive index ellipsoid are completely different.

Figure 22:
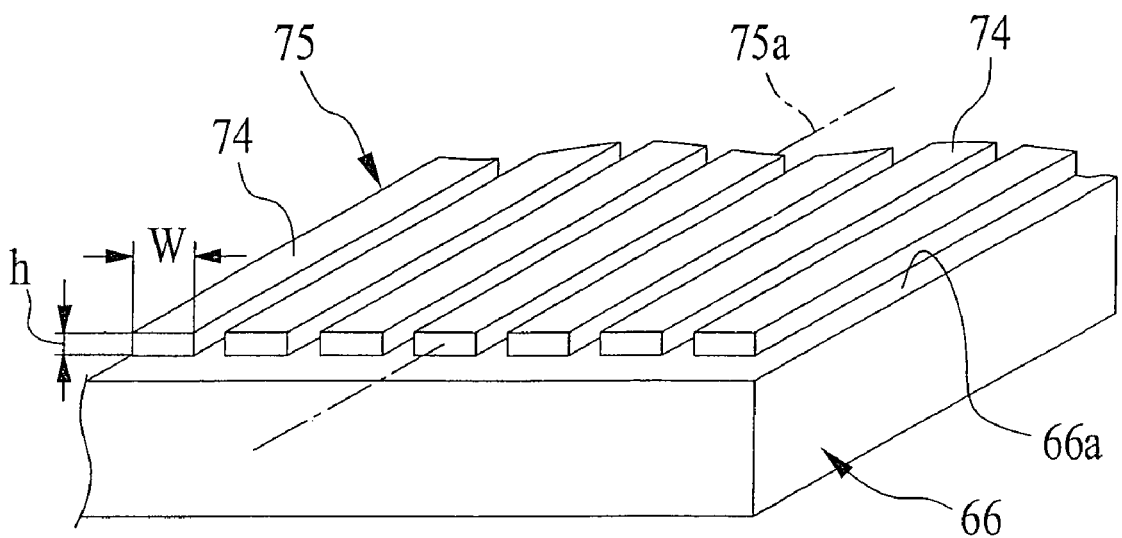

When the aspect ratio of the ridges is extremely small, the form birefringence layer 75 becomes a positively birefringent a-plate, as shown in FIG. 22. The form birefringence layer 75 has transparent dielectric ridges 74 arranged in line at certain intervals on the glass substrate 66. The width W, height h and the interval of the ridges 74 are much smaller than the wavelength of incident light, as described in the above embodiment. The retardation value of the form birefringence layer 75 is the product of the height h and the refractive index of the ridge 74. The optical isotropic axis 75a extends in the direction parallel to the ridges 74. The arrangement of the ridges 74 causes one-dimensional refractive index distribution by air and the ridge in the plane perpendicular to the illumination or projection axis. The form birefringence layer 75 is located such that the top surface 66a of the glass plate 66 is perpendicular to the illumination or projection axis.

When the height h of the ridge 74 becomes larger than the wavelength of incident light, the form birefringence layer 75 becomes a biaxial birefringence body. If the height of the ridge 74 becomes much larger than the wavelength, the form birefringence layer 75 exhibits optical characteristics of a negatively birefringent c-plate. Note that the gap between two ridges 74 may be filled with a dielectric material with different refractive index from the ridge 74.

Figure 23:
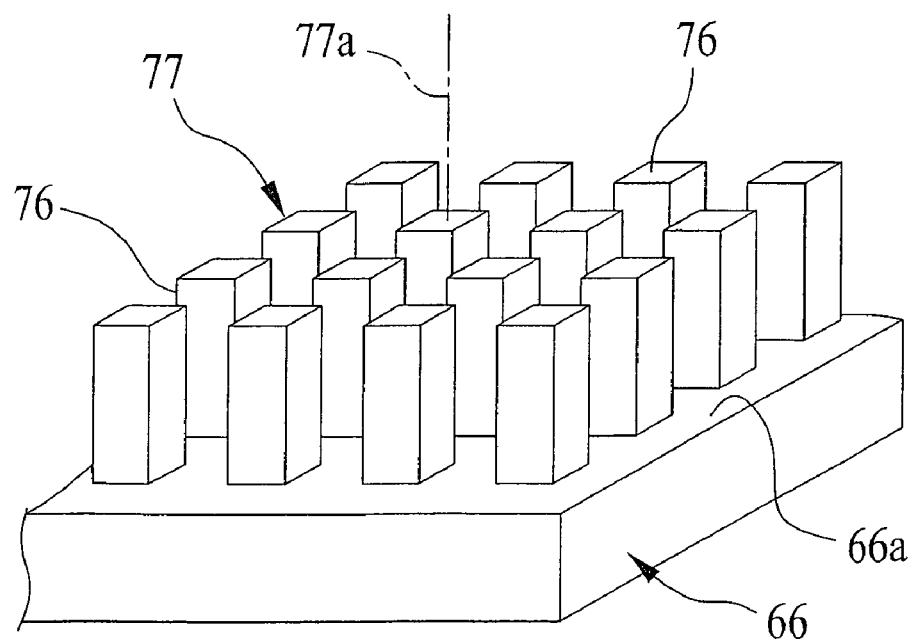

It is possible to utilize a positively birefringent c-plate as the form birefringence layer of the present invention. As shown in FIG. 23, the form birefringence layer 77 has transparent dielectric pillars 76 arranged at certain intervals on the glass substrate 66. Each dielectric pillar 76 has a substantially rectangular parallelepiped shape. The size and the intervals of the dielectric pillars 76 are much smaller than the wavelength of incident light. The form birefringence layer 77 is located such that the top surface 66a of the glass plate 66 is perpendicular to the illumination or projection axis. The optical isotropy axis 77a is perpendicular to the top surface 66a of the glass substrate 66. The arrangement of the pillars 76 causes two-dimensional refractive index distribution by air and the pillar in the plane perpendicular to the illumination or projection axis. The pillars 76 are formed by photo lithography and etching processes. Note that the gap between the pillars 76 may be filled with a dielectric material with different refractive index from the pillar 76.

Figure 24:
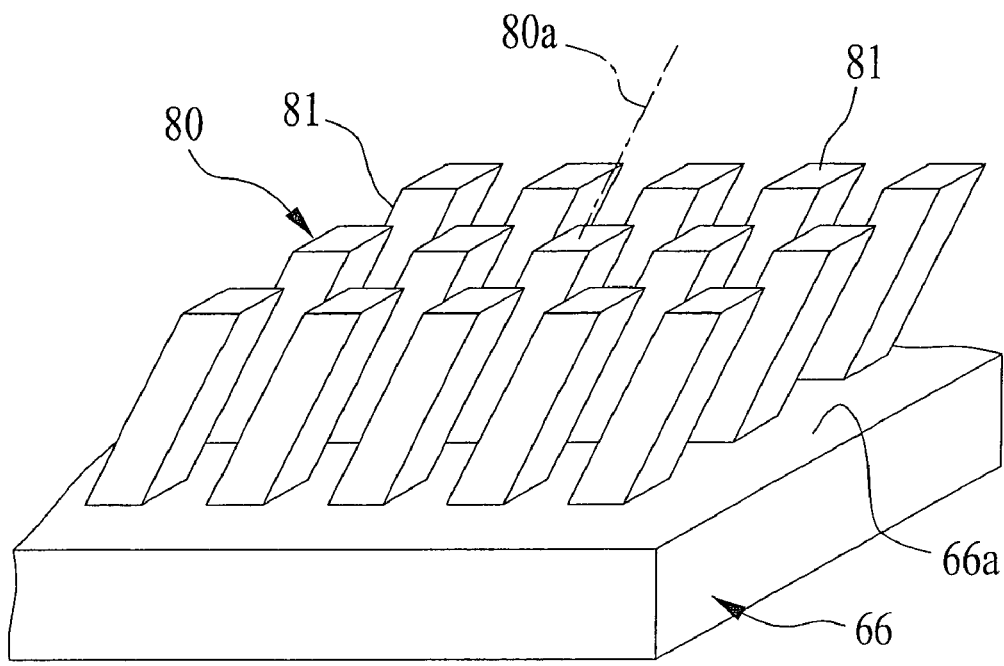

FIG. 24 shows another embodiment of the positively birefringent o-plate as the form birefringence layer 80 with transparent dielectric pillars 81 regularly arranged on the glass substrate 66. The dielectric pillars 81 are inclined to the glass substrate 66 at a predetermined angle. The size and the intervals of the dielectric pillars 81 are much smaller than the wavelength of incident light. The gap between the pillars 81 may be filled with air or a dielectric material with different refractive index from the pillar 81. The optical axis 80a of the form birefringence layer 80 is oblique to the top surface 66a of the glass substrate 66. It is possible to form the pillars 81 by photo lithography and etching processes.

Figure 25:
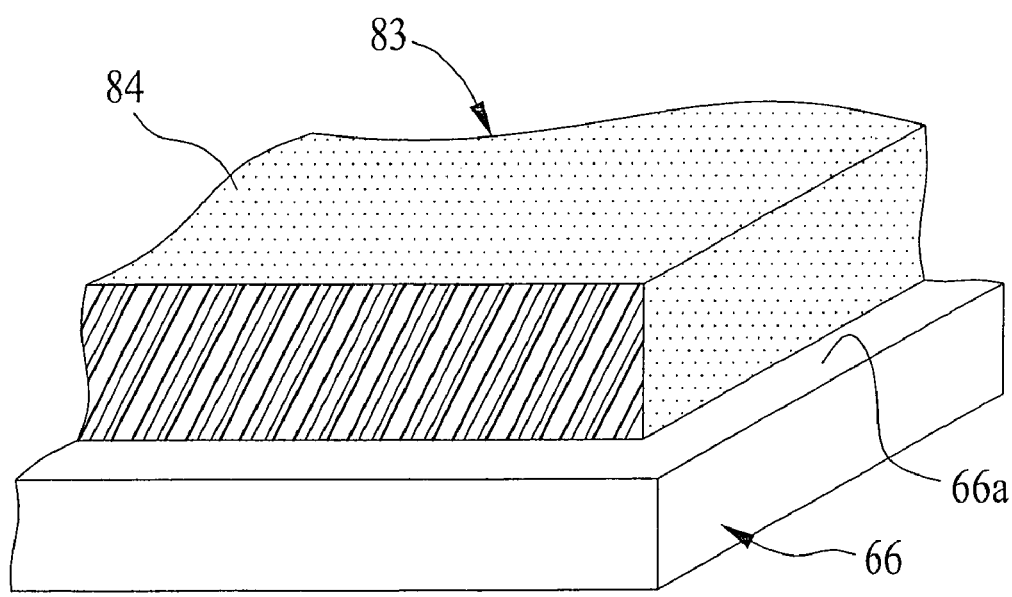
FIG. 25 is a partial perspective view of the form birefringence layer formed by oblique deposition.

The positively birefringent o-plate may be formed by oblique deposition of one kind of dielectric material on the glass substrate 66 (see FIG. 25), as described in U.S. Pat. No. 5,638,197. Note that the oblique lines in FIG. 25 do not depict the borders between adjacent thin film layers 84. The form birefringence layer 83 is located so that the top surface 66a of the glass plate 66 is perpendicular to the illumination or projection axis. Accordingly, the oblique thin film layers 84 exhibit positively birefringent o-plate.

In the above embodiments, the inorganic retardation compensators are located such that the top surface 66a of the glass plate 66 is perpendicular to the illumination or projection axis. The retardation compensator may be inclined to the illumination or projection axis for the purpose of compensating the retardation more effectively. The inclined angle is preferably less than or equal to 45°, more preferably less than or equal to 10°, most preferably less than or equal to 5°. It is also possible to provide more than one and less than eleven retardation compensators. Preferably, more than one and less than five retardation compensators are combined. Plural retardation compensators may be inclined to the illumination or projection axis. Moreover, the inclined angles of the retardation compensators may be different from one another.

Plural retardation compensators of different types may be combined. For instance, the combination of a negative c-plate, a negative o-plate and a positive a-plate makes it possible to compensate the retardation more effectively so that the image contrast ratio on the screen is improved. The retardation compensator is applicable to the liquid crystal devices of other type than transmittance TN type. Examples of the liquid crystal devices are reflective TN type, ECB (Electrically Controlled Birefringence) type, VA (Vertical Aligned) type, OBC (Optically Compensatory Bend) type and FLC (Ferro Liquid Crystal) type. The present invention is also applicable to the liquid crystal projector, such as the off-axis type and the micro lens type, in which incident light obliquely enters the liquid crystal device.

In forming the retardation compensator from thin films by deposition or sputtering, the substrate may be fixed to the optical part such as the lens element of illumination or projection lens system and the glass substrate of the liquid crystal device. Forming the thin films for the retardation compensator on such optical part is effective in reducing the optical parts and the alignment process to adjust the position and angle of the optical parts.

The retardation compensator may be attached on either the inner surface or the outer surface of the substrate of the liquid crystal device. The retardation compensator is preferably attached on the inner surface for the purpose of reducing interfacial reflection between air and the retardation compensator. Such arrangement of the retardation compensator can effectively decrease light leakage or deterioration in image quality.

The phase compensator may be attached to either the active side substrate with pixel electrodes to apply the voltage, or the opposite side substrate with the common electrode. The anti-reflection coating is preferably on either or both sides of the phase compensator, if necessary. In forming the thin films as the retardation compensator, interferential thin films as the anti-reflection coating is easily formed.

The thickness of each layer in the retardation compensator of thin film type is not necessarily equal. The retardation compensator in the liquid crystal projector is not limited to the one with two kinds of thin films alternatively deposited on the substrate. For instance, more than two kinds of thin films with different refractive indices may be deposited. The thickness and the deposition order may be determined in consideration of fabrication facility, internal stress in each layer, wavelength dependency of the refractive index of the thin film, and so forth. It is possible to combine the form birefringence layers described above with a retardation compensation sheet that has a polymer film as the substrate.

INDUSTRIAL APPLICABILITY

The present invention is applicable to a liquid crystal projector to project an image onto a screen.

The invention claimed is:

1. A transmissive liquid crystal projector having at least one liquid crystal device and a projection optical system, said liquid crystal device changing illumination light from a light source into image light, said projection optical system focusing said image light onto a screen, said illumination light being guided to an incidence plane of said liquid crystal device, and said image light being emanated from an emanation plane opposite to said incidence plane, said liquid crystal projector comprising:
a polarizer provided in said incidence plane side of said liquid crystal device;
an analyzer provided in said emanation plane side of said liquid crystal device; and
an inorganic form birefringence layer provided between said polarizer and said analyzer in at least one of said incidence plane side and said emanation plane side.

2. A liquid crystal projector according to claim 1, wherein said form birefringence layer is plural thin films, said thin films comprising at least two kinds of thin films layers with different refractive index alternatively stacked.

3. A liquid crystal projector according to claim 2, wherein the optical thickness of said thin film layer is from $\lambda/100$ to $\lambda/5$, wherein $\lambda$ is the wavelength of said illumination light that enters said liquid crystal device.

4. A liquid crystal projector according to claim 1, wherein said form birefringence layer is a plurality of birefringence members arranged to appear one or two dimensional refractive index distribution in the plane perpendicular to the optical axis of said illumination light or said image light.

5. A liquid crystal projector according to claim 4, wherein said birefringence members are inclined to the optical axis of said illumination light or said image light.

6. A liquid crystal projector according to claim 1, wherein a c-plate or an o-plate made of said inorganic form birefringence layer is disposed in the optical axis of said illumination light or said image light with being inclined to said optical axis.

7. A liquid crystal projector having at least one liquid crystal device and a projection optical system, said liquid crystal device changing illumination light from a light source into image light, said projection optical system focusing said image light onto a screen, said liquid crystal device having a liquid crystal layer between a pair of substrate bodies, an orientation film and electrode formed on said substrate body, said liquid crystal projector comprising:
an inorganic form birefringence layer formed on at least one surface of at least one substrate body, said form birefringence layer compensating retardation of light that passes said liquid crystal layer.

8. A liquid crystal projector according to claim 7, wherein said form birefringence layer is plural thin films, said thin films comprising at least two kinds of thin film layers with different refractive index alternatively stacked.

9. A liquid crystal device having a liquid crystal layer between a pair of substrate bodies, an orientation film and electrode formed on said substrate body, said liquid crystal device comprising:
an inorganic form birefringence layer formed on at least one surface of at least one substrate body, said form birefringence layer compensating retardation of light that passes said liquid crystal layer.

10. A liquid crystal device according to claim 9, wherein said form birefringence layer is plural thin films, said thin films comprising at least two kinds of thin film layers with different refractive index alternatively stacked.

11. A substrate for a liquid crystal device for enclosing a liquid crystal layer, said substrate having an orientation film and electrode formed on the inner surface side of said substrate body, said substrate comprising:
an inorganic form birefringence layer formed on at least one of the inner surface side and the outer surface side of said substrate body, said form birefringence layer compensating retardation of light that passes said liquid crystal layer.

12. A substrate for a liquid crystal device according to claim 11, wherein said form birefringence layer is plural thin films, said thin films comprising at least two kinds of thin film layers with different refractive index alternatively stacked.

13. A substrate for a liquid crystal device according to claim 12, wherein said plural thin films consist of first thin films with high refractive index and second thin films with low refractive index that are alternatively stacked.

14. A substrate for a liquid crystal device according to claim 11, wherein said form birefringence layer is formed on the inner surface of said substrate body.

15. A substrate for a liquid crystal device according to claim 11, wherein said form birefringence layer is formed on the outer surface of said substrate body.

16. A substrate for a liquid crystal device according to claim 11, wherein said form birefringence layers are formed on the outer and inner surfaces of said substrate body.

* * * * *